US012189263B2

(12) United States Patent
Amin et al.

(10) Patent No.: US 12,189,263 B2
(45) Date of Patent: Jan. 7, 2025

(54) TRANSPARENT CONDUCTING OXIDE (TCO) BASED INTEGRATED MODULATORS

(71) Applicant: The George Washington University, Washington, DC (US)

(72) Inventors: Rubab Amin, Fairfax, VA (US); Volker J. Sorger, Alexandria, VA (US)

(73) Assignee: The George Washington University, Washington, DC (US)

( * ) Notice: Subject to any disclaimer, the term of this patent is extended or adjusted under 35 U.S.C. 154(b) by 0 days.

(21) Appl. No.: 17/681,158

(22) Filed: Feb. 25, 2022

(65) Prior Publication Data
US 2022/0179279 A1 Jun. 9, 2022

Related U.S. Application Data

(62) Division of application No. 16/545,733, filed on Aug. 20, 2019, now Pat. No. 11,281,067.

(60) Provisional application No. 62/719,988, filed on Aug. 20, 2018.

(51) Int. Cl.
*G02F 1/225* (2006.01)
*G02F 1/025* (2006.01)
*G02F 1/015* (2006.01)
*G02F 1/21* (2006.01)

(52) U.S. Cl.
CPC ............ *G02F 1/225* (2013.01); *G02F 1/025* (2013.01); *G02F 1/0157* (2021.01); *G02F 1/212* (2021.01); *G02F 2203/10* (2013.01)

(58) Field of Classification Search
CPC ........ G02F 1/0157; G02F 1/025; G02F 1/212; G02F 1/225; G02F 2203/10
See application file for complete search history.

(56) References Cited

U.S. PATENT DOCUMENTS

| | | |
|---|---|---|
| 4,684,207 A | 8/1987 | Lawless |
| 6,614,947 B1 | 9/2003 | Al-Hemyari |
| 7,123,784 B2 | 10/2006 | Sato |
| 8,014,636 B2 | 9/2011 | Shubin |
| 10,133,098 B2 | 11/2018 | Chen |
| 10,732,441 B2 * | 8/2020 | Wang ................ G02F 1/025 |
| 10,908,438 B1 | 2/2021 | Wood |
| 10,908,440 B1 | 2/2021 | Wood et al. |
| 11,281,067 B2 * | 3/2022 | Amin ................ G02F 1/025 |
| 2010/0098424 A1 * | 4/2010 | Ho ................... G02F 1/065 |
| | | 398/116 |

(Continued)

OTHER PUBLICATIONS

L. Alloatti, et al., "42.7 Gbit/s Electro-Optic Modulator in Silicon Technology", Optics Express, vol. 19, No. 12, Jun. 2011, pp. 11841-11851.

(Continued)

*Primary Examiner* — Daniel Petkovsek
(74) *Attorney, Agent, or Firm* — BLANK ROME LLP

(57) ABSTRACT

A photonic Mach Zehnder Interferometer (MZI) has a first arm with a first photonic waveguide transmitting a first light having a first phase, a second arm with a second photonic waveguide transmitting a second light having a second phase, and a Transparent Conducting Oxide (TCO) based assembly. The TCO assembly is positioned about the first photonic waveguide of the first arm to modulate the first phase of the first light traveling in the first photonic waveguide.

21 Claims, 13 Drawing Sheets

(56) References Cited

U.S. PATENT DOCUMENTS

2012/0003767 A1* 1/2012 Fujikata ............... G02F 1/025
    438/22
2016/0109731 A1 4/2016 Huang

OTHER PUBLICATIONS

R. Palmer, et al., "Low Power Mach-Zehnder Modulator in Silicon-Organic Hybrid Technology", IEEE Photonics Technology Letters, vol. 25, No. 13, Jul. 1, 2013, pp. 1226-1229.

S. Akiyama, et al., "50-GB/s Silicon Modulator Using 250-um-Long Phase Shifter Based-on Forward-Biased Pin Diodes", IEEE, 2012, pp. 192-194.

S. Dogru et al., "0.77-V Drive Voltage Electro-Optic Modulator with Bandwidth Exceeding 67 GHz", Optics Letters, vol. 39, No. 20, Oct. 15, 2014, pp. 6074-6077.

A. Brimont, et al., "High-Contrast 40 GB/s Operation of a 500 um Long Silicon Carrier-Depletion Slow Wave Modulator", Optics Letters, vol. 37, No. 17, Sep. 1, 2012, pp. 3504-3506.

J. Fujikata, et al., "25 GHz Operation of Silicon Optical Modulator with Projection MOS Structure", OSA/OFC/NFOEC, 2010, 3 pgs.

C. Wang, et al., "Nanophotonic Lithium Niobate Electro-Optic Modulators", Optics Express, vol. 26, No. 2, Jan. 22, 2018, pp. 1547-1555.

P. Dong, et al., "High-Speed Low-Voltage Single-Drive Push-Pull Silicon Mach-Zehnder Modulators", Optics Express, vol. 20, No. 6, Mar. 12, 2012, pp. 6163-6169.

D. J. Thomson, et al., "High Contrast 40Gbit/s Optical Modulation in Silicon", Optics Express, vol. 19, No. 12, Jun. 6, 2011, pp. 11507-11516.

F. Lucchi et al., "Very Low Voltage Single Drive Domain Inverted LiNbO3 Integrated Electro-Optic Modulator", Optics Express, vol. 15, No. 17, Aug. 20, 2007, pp. 10739-10743.

D. Janner, et al.,. "Micro-Structured Integrated Electro-Optic LiNbO3 Modulators", Laser & Photon. Rev., vol. 3, No. 3, 2009, pp. 301-313.

L. Liao, et al., "40 Gbit/s Silicon Optical Modulator for High-Speed Applications", Electronics Letters, vol. 43, No. 22, Oct. 25, 2007, 2 pgs.

E. L. Wooten, et al., "A Review of Lithium Niobate Modulators for Fiber-Optic Communications Systems", IEEE Journal of Selected Topics in Quantum Electronics, vol. 6, No. 1, Jan./Feb. 2000, pp. 69-82.

D. J. Thomson, et al., "50-GB/s Silicon Optical Modulator", IEEE Photonics Technology Letters, vol. 24, No. 4, Feb. 15, 2012, pp. 234-236.

X. Xiao, et al., "High-Speed, Low-Loss Silicon Mach-Zehnder Modulators with Doping Optimization", Optics Express, vol. 21, No. 4, Feb. 25, 2013, pp. 4116-4125.

M. Ziebell, et al., "40 Gbit/s Low-Loss Silicon Optical Modulator Based on a Pipin Diode", Optics Express, vol. 20, No. 10, May 7, 2012, pp. 10591-10596.

L. Chen, et al., "Monolithic Silicon Chip with 10 Modulator Channels at 25 Gbps and 10-GHz Spacing", Optics Express, vol. 19, No. 26, Dec. 12, 2011, pp. B946-B951.

40 GB/s Silicon Photonics Modulator for TE and TM Polarisations, Optics Express, vol. 19, No. 12, Jun. 6, 2011, pp. 11804-11814.

S. Dogru, et al., "0.2 V Drive Voltage Substrate Removed Electro-Optic Mach-Zehnder Modulators with MQW Cores at 1.55 um", Journal of Lightwave Technology, vol. 32, No. 3, Feb. 1, 2014, pp. 435-439.

Hui-Wen Chen, et al., "Hybrid Silicon Modulators", Chinese Optics Letters, vol. 7, No. 4, Apr. 10, 2009, pp. 280-285.

R. Amin, et al., "0.52 V mm ITO-Based Mach-Zehnder Modulator in Silicon Photonics", ADL Photonics, https://doi.org/10.1063/1.5052635, vol. 3, 126104, 2018, pp. 126104-1-126104-11.

J. Shin, et al., "0.3 V Drive Voltage GaAs/AlGaAs Substrate Removed Mach-Zehnder Intensity Modulators", Applied Physics Letters, https://doi.org/10.1063/1.2931057, vol. 92, 201103, 2008, pp. 201103-1-201103-3.

W. M. J. Green, et al., "Ultra-Compact, Low RF Power, 10 GB/s Silicon Mach-Zehnder Modulator", Optics Express, vol. 15, No. 25, Dec. 10, 2007, pp. 17106-17113.

F. Li, et al., "Monolithic Silicon-Based 16-QAM Modulator Using Two Plasmonic Phase Shifters", Optics Communications, www.elsevier.com/locate/optcom, vol. 286, 2013, pp. 166-170.

C. Haffner, et al., "All-Plasmonic Mach-Zehnder Modulator Enabling Optical High-Speed Communication at the Microscale", Nature Photonics, Letters, www.nature.com/naturephotonics, vol. 9, Aug. 2015, pp. 525-529.

* cited by examiner

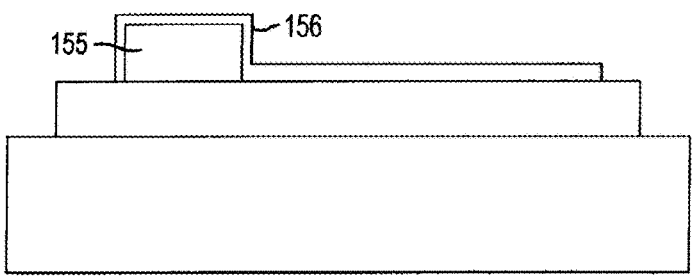
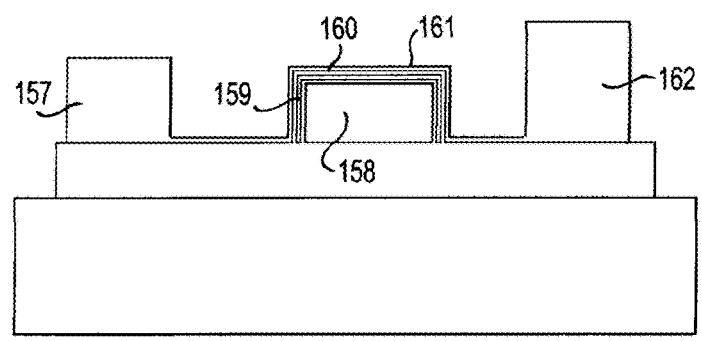
Figure 6(a)
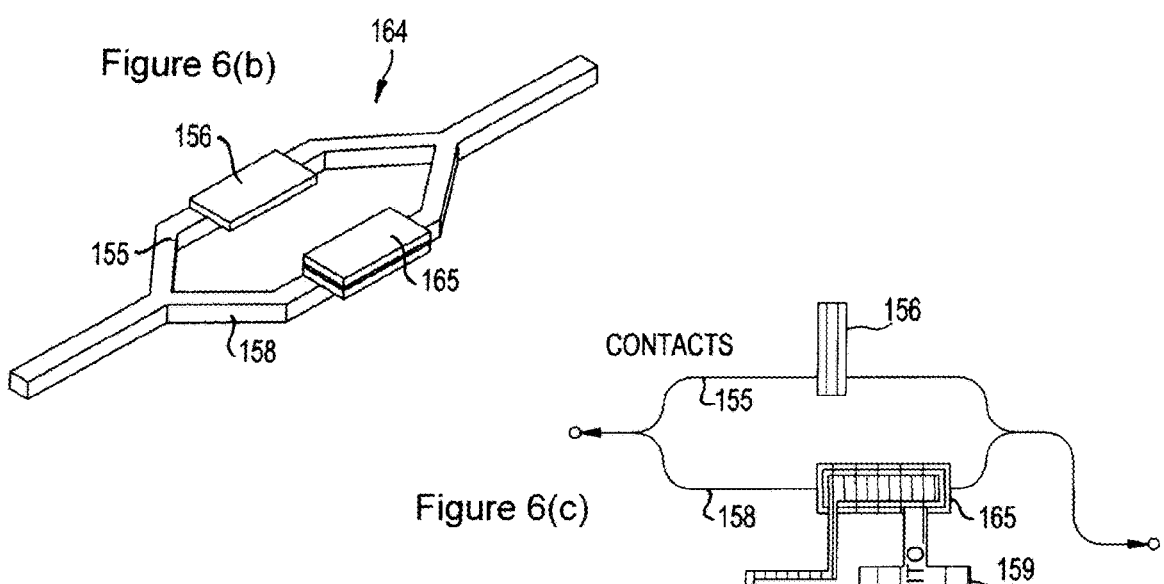
Figure 6(b)
Figure 6(c)
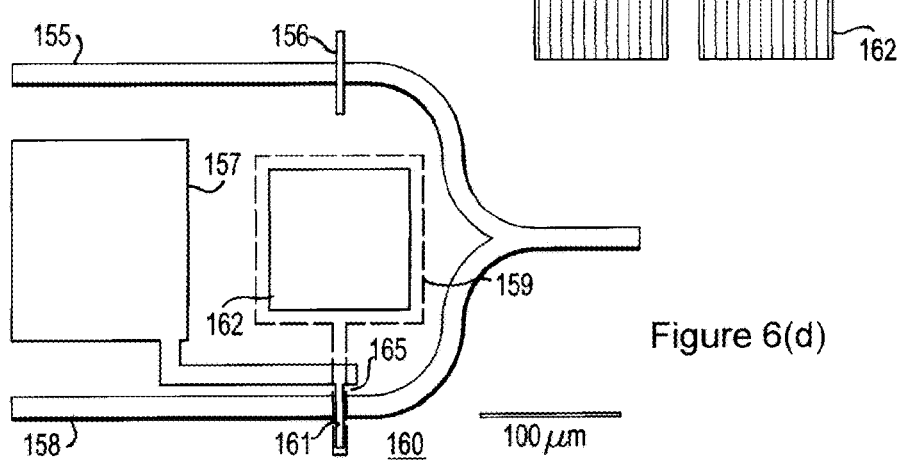
Figure 6(d)

ITO ▭
Si ▨
HfO₂ ▧
SiO₂ ▭

TRANSPARENT CONDUCTING OXIDE (TCO) BASED INTEGRATED MODULATORS

RELATED APPLICATION

This application is a divisional application of U.S. application Ser. No. 16/545,733, filed Aug. 20, 2019, now U.S. Pat. No. 11,281,067, which claims the benefit of U.S. Provisional Application No. 62/719,988, filed Aug. 20, 2018, the entire contents of each being incorporated herein by reference.

GOVERNMENT LICENSE RIGHTS

This invention was made with government support from the Army Research Office (under grant number W911NF-16-2-0194) and Air Force Office of Scientific Research (under grant number FA9550-14-1-0378). The government has certain rights in the invention.

BACKGROUND OF THE INVENTION

Indium tin oxide (ITO) is a ternary compound which belongs to the class of transparent conductive oxide (TCO). For its coexisting optical and electrical properties, the large interest surrounding ITO, which was mainly pushed due to its use in the industry, product-related purposes and timely applications, enabled high-yield and reliable wafer scale fabrication processes, compatible with the CMOS technology production line, which makes this material even more appealing for a plethora of other applications. The underlying modulation mechanism for all TCO materials (e.g. aluminum doped zinc oxide (AZO), fluorine doped tin oxide (FTO), gallium-doped zinc oxide (GZO), indium-doped zinc oxide (IZO), magnesium-doped zinc oxide (MZO), aluminum and gallium co-doped zinc oxide (AGZO), Indium gallium zinc oxide (IGZO), Zinc Oxide (ZnO), Indium oxide ($In_2O_3$) etc.), including ITO, are the same—free carrier absorption dynamics arising from accumulation/depletion of the carriers in a capacitive stack. As the drive voltage is increased, free carriers leading to dispersive effects are induced and a corresponding net increase occurs in the carrier concentration.

Electro-optic (EO) modulators can be used, for example, to convert between electrical signals (e.g., digital signals) and optical signals. EO modulation is achieved by either changing the real part (n) of the modal refractive index leading to phase shifting-based interferometric devices termed electro-optic modulators (EOM), or by modulating the imaginary part (κ) of the modal index of linear electro-absorptive modulators (EAM). In both types, the fundamental complex index of refraction is altered electrically in the active material, which in turn modifies the propagation constant of the mode inside the respective waveguide. EOMs operate by changing the real part of the index, which relates to the phase of the light, whereas EAMs operate by changing the imaginary part of the index, which relates to the intensity absorption of the light.

Kramers-Kronig relations dictate that changing the real part of the complex index independent from simultaneously altering the imaginary part is impossible. Since phase modulators require interferometric schemes (e.g., ring resonators and Mach Zehnder Interferometers (MZI)), they do inherently suffer from an extended footprint compared to absorption-based modulators. In Mach Zehnder Modulators (MZM) (which is an MZI used in an active modulation scheme), the product of the half-wave voltage times the active modulator length, $V_\pi L$, is a figure of merit (FOM) since they exhibit a tradeoff between obtaining π-phase shift with increased device length or voltage.

The devices exhibiting advanced FOMs, shown in Table 1 below, amount plasmonics, integration of organic/polymer materials, III-V quantum well structures, etc. Many of these schemes essentially offer acceptable performance but are mostly difficult to integrate in the mature Si process. The present invention can avail ease of fabrication and CMOS integration. The references noted are herein incorporated by reference.

TABLE 1

Figure of merit (FOM) comparison for Mach Zehnder devices with different active modulation materials and waveguide structures in recent years

| Structure/Material | $V_\pi L$ (V. μm) | Ref. |
| --- | --- | --- |
| Si Wrapped around-pn | 140,000 | F. Y. Gardes, D. J. Thomson, N. G. Emerson, and G. T. Reed, "40 Gb/s silicon photonics modulator for TE and TM polarisations," Opt. Express 19(12), 11804-11814 (2011). |
| Coplanar waveguide $LiNbO_3$ | 20,000 | E. L. Wooten, K. M. Kissa, A. Yi-Yan, E. J. Murphy, D. A. Lafaw, P. F. Hallemeier, D. Maack, D. V. Attanasio, D. J. Fritz, G. J. McBrien, and D. E. Bossi, "A review of lithium niobate modulators for fiber-optic communications systems," IEEE J. of Select. Topics in Quant Elec. 6(1), 69-82 (2000). |
| Si Wrapped around-pn | 110,000 | F. Y. Gardes, D. J. Thomson, N. G. Emerson, and G. T. Reed, "40 Gb/s silicon photonics modulator for TE and TM polarisations," Opt. Express 19(12), 11804-11814 (2011). |
| Domain inverted push-pull $LiNbO_3$ | 90,000 | F. Lucchi, D. Janner, M. Belmonte, S. Balsamo, M. Villa, S. Giurgiola, P. Vergani, and V. Pruneri, "Very low voltage single drive domain inverted LiNbO3 integrated electro-optic modulator," Opt. Express 15(17), 10739-10743 (2007). |
| Dual driven coplanar waveguide $LiNbO_3$ | 80,000 | E. L. Wooten, K. M. Kissa, A. Yi-Yan, E. J. Murphy, D. A. Lafaw, P. F. Hallemeier, D. Maack, DN. Attanasio, D. J. Fritz, G. J. McBrien, and D. E. Bossi, ".A. review of lithium niobate modulators for fiber-optic communications systems," IEEE J. of Select. Topics in Quant Elec. 6(1), 69-82 (2000). |
| Si Vertical-pn | 40,000 | L. Liao, A. Liu, D. Rubin, J. Basak, Y. Chetrit, H. Nguyen, R. Cohen, N. Izhaky, and M. Paniccia, "40 Gbit/s silicon optical modulator for high speed applications," Electron. Lett. 43(22), 1196-1197 (2007). |

TABLE 1-continued

Figure of merit (FOM) comparison for Mach Zehnder devices with different active modulation materials and waveguide structures in recent years

| Structure/Material | $V\pi L$ (V. μm) | Ref. |
|---|---|---|
| Bulk LiNbO$_3$ physical limit | 36,000 | D. Janner, D. Tulli, M. Garcia-Granda, M. Belmonte, and V. Pruneri, "Micro-structured integrated electro-optic LiNbO$_3$ modulators," Laser Photonics Rev. 3(3), 301-313 (2009). |
| Si pipin | 35,000 | M. Ziebell, D. Marris-Morini, G. Rasigade, J. -M. Fédéli, P. Crozat, E. Cassan, D. Bouville, and L. Vivien, "40 Gbit/s low-loss silicon optical modulator based on a pipin diode," Opt. Express 20(10), 10591-10596 (2012). |
| Si Lateral-pn | 28,000 | D. Thomson, F. Gardes, J. Fedeli, S. Zlatanovic, Y. Hu, B. Kuo, E. Myslivets. N. Alic, S. Radic, G. Z. Mashanovich, and G. T. Reed, "50Gbit/s silicon optical modulator," IEEE Photon. Technol. Lett. 24(4), 234-236 (2012). |
| Si Lateral-pn | 27,000 | D. J. Thomson, F. Y. Gardes, Y. Hu, G. Mashanovich, M. Fournier, P. Grosse, J. -M. Fédéli, and G. T. Reed, "High contrast 40 Gbit/s optical modulation in silicon," Opt. Express 19(12), 11507-11516 (2011). |
| Si pn-depletion | 24,000 | L. Chen, C. R. Doerr, P. Dong, and Y. -K. Chen, "Monolithic silicon chip with 10 modulator channels at 25 Gbps and 100-GHz spacing," Opt, Express 19(26), B946-B951 (2011). |
| Doping optimized Si | 20,500 | X. Xiao, EL Xu, X. Li, Z, .Li, T. Chu, Y, Yu, and J, Yu, "High-speed, low-loss silicon Mach-Zehnder modulators with doping optimization," Opt. Express 21(4), 4116-4125 (2013). |
| Si Self-aligned-pn | 18,600 | P. Dong, L. Chen, and Y. -K. Chen, "High-speed low-voltage single-drive push-pull silicon Mach-Zehnder modulators," Opt. Express 20(6), 6163-6169 (2012). |
| Integrated thin film LiNbO$_3$ on insulator | 18,000 | C. Wang, M. Zhang, B. Stern, M. Lipson, and M. Loncar, "Nanophotonic lithium niobate electro-optic modulators," Opt. Express 26(2), 1547-1555 (2018), |
| Si pin | 13,000 | S. Akiyama, T. Baba, M. Imai, T. Akagawa, M. Noguchi, E. Saito, Y. Noguchi, N. Hirayama, T. Horikawa, and T. Usuki, "50-Gbit/s silicon modulator using 250-_m-long phase shifter based on forward-biased pin diodes," in Proceedings of 9$^{th}$ IEEE International Conference on Group IV Photonics (IEEE, 2012), pp. 192-194. |
| Silicon-organic hybrid (SOH) | 9,000 | L. Alloatti, D. Korn, R. Palmer, D. Hillerkuss, J. Li, A. Barklund, R. Dinu, J. Wieland, M. Fournier, J. Fedeli, H. Yu W. Bogaerts, P. Dumon, R. Baets, C. Koos, W. Freude, and J. Leuthold, "42.7 Gbit/s electro-optic modulator in silicon technology," Opt. Express 19 (12) , 11841-11851 (2011). |
| Si Lateral-pn | 8,500 | A. Brimont, D. J. Thomson, F. Y. Gardes, J. M. Fedeli, G. T. Reed, J. Mart'$_1$, and P. Sanchis, "High-contrast 40 Gb/s operation of a 500 μm long silicon carrier-depletion slow wave modulator," Opt. Lett. 37(17), 3504-3506 (2012). |
| Si Projection | 5,000 | J. Fujikata, J. Ushida, T. Nakamura, Y. Ming-Bin, Z. ShiYang, D. Liang, P. L. Guo-Qiang, and D. Kwong, "25 GHz Operation of Silicon Optical Modulator with Projection MOS Structure," in Optical Fiber Communication Conference, OSA Technical Digest (CD) (Optical Society of America, 2010), paper OMI3. |
| III-V Multiple Quantum Wells (MQW) | 4,600 | S. Dogru and N. Dagli, "0.77-V drive voltage electro-optic modulator with bandwidth exceeding 67 GHz," Opt. Lett. 39 (20), 6074-6077 (2014). |
| SOH | 3,800 | R. Palmer, L. Alloatti, D. Korn, P. C. Schindler, M. Baier, J. Bolten, T. Wahlbrink, M. Waldow, R. Dinu, W. Freude, C. Koos,and J. Leuthold, "Low power Mach-Zehnder modulator in silicon-organic hybrid technology," IEEE Photonics Technol. Lett. 25(13), 1226-1229 (2013). |
| GaAs/AlGaAs | 2,100 | J. Shin, Y. -C. Chang, and N. Dagli, "0.3 V drive voltage GaAs/AlGaAs substrate removed Mach-Zehnder intensity modulators," Appl. Phys. Lett. 92, 201103 (2008). |
| Hybrid Si MQW | 2,000 | H. -W. Chen, Y. Kuo, and J. E. Bowers, "Hybrid silicon modulators," Chin. Opt. Lett. 7(4), 280-285 (2009). |
| InGaAlAs/InAlAs MQW | 600 | S. Dogru and N. Dagli, "0.2 V drive voltage substrate removed electro-optic Mach-Zehnder modulators with MQW cores at 1.55 μm," J. Lightwave Technol. 32(3), 435-439 (2014). |
| ITO MOS (Photonic ITO MIZI-This invention)* | 520 | R. Amin, R. Maiti, C. Carfano, Z. Ma, M. H. Tahersima, Y. Lilach, D. Ratnayake, H. Dalir, and V. J. Sorger, "0.52 V mm ITO-based Mach-Zehnder modulator in silicon photonics," APL Photonics 3(12), 126104 (2018). |
| Si p$^+$-i-n$^+$ | 360 | W. M. J. Green, M. J. Rooks, L. Sekaric, and Y. A. Vlasov, "Ultra-compact, low RF power, 10 Gbls silicon Mach-Zehnder modulator," Opt. Express 15(25), 17106-17113 (2007). |

TABLE 1-continued

Figure of merit (FOM) comparison for Mach Zehnder devices with different active modulation materials and waveguide structures in recent years

| Structure/Material | VπL (V. μm) | Ref. |
|---|---|---|
| ITO Plasmonic Vertical MOS (Plasmonic ITO MZI Vertical Capacitor-This invention)* | 95 | N/A |
| EO Polymer Plasmonic | 70 | F. Li, M. Xu, X. Hu, J. wu, T. Wang, and Y. Su, "Monolithic silicon-based 16-QAM modulator using two plasmonic phase shifters," Opt. Commun. 286, 166-170 (2013). |
| ITO Lateral MOS (Plasmonic ITO Lateral Capacitor MZI-This invention)* | 63 | N/A |
| Liquid crystals with SOH slot/ all-plasmonic polymer | 60 | C. Haffner, W. Heni, Y. Fedoryshyn, J. Niegemann, A. Melikyan, D. L. Elder, B. Baeuerle, Y. Salamin, A. Josten, U. Koch, C. Hoessbacher, F. Ducry, L. Juchli, A. Einboras, D Hillerkuss, M. Kohl, L. R. Dalton, C. Hafner, and J. Leuthold, "All plasmonic Mach-Zehnder modulator enabling optical high-speed communication at the microscale," Nat, Photonics 9, 525-528 (2015). |

SUMMARY OF THE INVENTION

It is one object of the invention to provide a photonic waveguide that modules the optical refractive index of light traveling in the waveguide. In accordance with this and other objectives, a photonic waveguide assembly has a photonic waveguide for transmission of light or a substrate, and an optical refractive index modulator positioned about said photonic waveguide to modulate the phase or amplitude, or combination thereof of the light traveling in the photonic waveguide, or transmitting through or reflecting of the substrate. The photonic waveguide assembly can be, for example, and MZI.

BRIEF DESCRIPTION OF THE DRAWINGS

FIG. 6(a) is cross-section views of a vertical MOS ITO based MZI arms;
FIG. 6(b) is a vertical MOS ITO based MZI in accordance with the invention;
FIG. 6(c) is top view schematic diagram of the FIG. 6(b) with contacts shown;
FIG. 6(d) is an optical microscope image of the MZI of FIG. 6(b)

FIG. 8(*e*) is a graph of output power vs. bias voltage.

DETAILED DESCRIPTION OF THE INVENTION

Figures 1A, 1B, 1C:
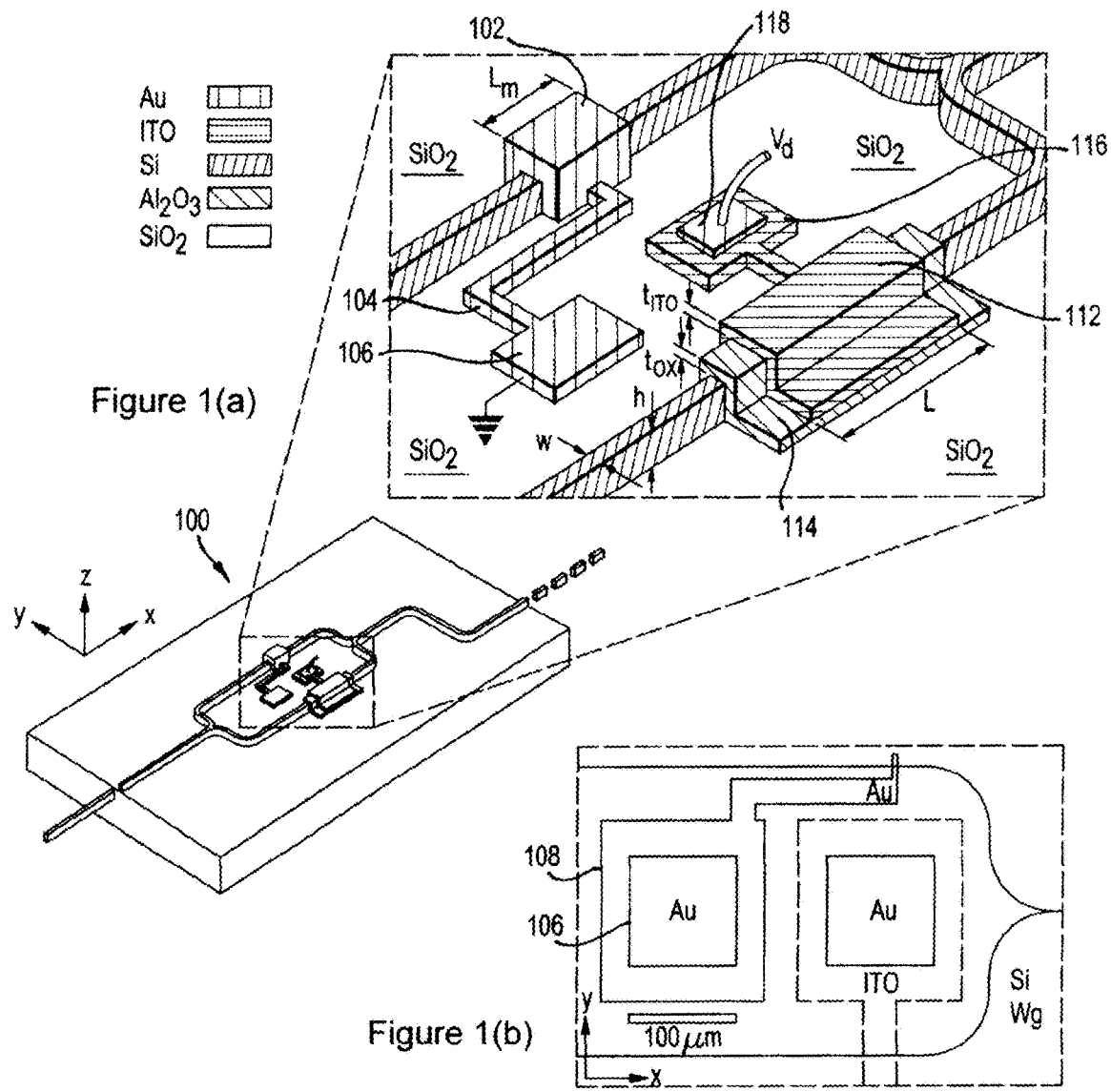
FIG. 1(a) shows an MZI in accordance with the invention.
FIG. 1(b) is an optical microscope image of the device of FIG. 1(a)
FIG. 1(c) is a Scanning Electron Microscope (SEM) image of the device of FIG. 1(a) and the inset shows a Focused Ion Beam (FIB) cross-section of the active capacitor.

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

Transparent conductive oxides (TCOs) are able to highly tune their optical properties with applied bias in capacitor configurations via altering their free carrier concentration and hence plasma dispersion. The TCO material indium tin oxide (ITO) exhibits unity-strong index change and epsilon-near-zero behavior. The choice of gating configuration and confinement factors can render different optical modes for modulation efficacy. Different optical modes, i.e. photonic/plasmonic/hybrid-plasmon-polariton (HPP), can be employed in capacitive stacks to invoke carrier injection (removal) leading to dispersive effects causing the free carrier accumulation (depletion) based modulation.

This capacitive gating strategy to tune the carrier concentration, and hence, the complex refractive index of the TCO can accomplish both phase and absorption modulation simultaneously. Phase modulation always necessitates a reference phase for comparison with the induced altered phase and as such requires some sort of interferometric arrangement (e.g. cavity feedback, travelling wave interferometers, etc.). Absorption modulators can be implemented in rather simple schemes (e.g. linear waveguides). Optical waveguide modulator modes can have: a) different polarizations; such as Transverse Electric (TE) or Transverse Magnetic (TM), and b) different structural mechanisms; such as photonic or surface-plasmon-based mode, or hybrid of photon/plasmon polaritonic (HPP) modes. The present invention demonstrates TCO based modulation in integrated Si photonics for both phase and absorption modulation in several schemes as manifested in Table 2 below. Capacitive modulation enabled stacks of a TCO material and another resistive material such as metal, dielectric or doped dielectric, TCO material, 2D materials, or gel-like materials can be utilized in such schemes.

TABLE 2

Different Electro-optic modulators formulated by transparent conducting oxide (TCO) capacitive stacks

| Modulator Type | Feedback | Optical Mode | Capacitor Structure (Gating scheme) |
|---|---|---|---|
| EOM (Phase modulation) | MZI | Photonic | Semiconductor (e.g. Si)/ Oxide (e.g. $SiO_2$, $Al_2O_3$, etc.)/ TCO (e.i. ITO) |
| | | Plasmonic | Metal (e.g. Au)/ Oxide (e.g. $SiO_2$, $Al_2O_3$, etc.)/ TCO (e.g. ITO) Lateral Capacitor Metal (e.g. Au)/ Oxide (e.g. $SiO_2$, $Al_2O_3$, etc.)/ TCO (e.g. ITO) Vertical Capacitor (HPP) |
| | PhC | Photonic | Semiconductor (e.g. Si)/ Oxide (e.g. $SiO_2$, $Al_2O_3$, etc.)/ TCO (e.g. ITO)/ Oxide (e.g. $SiO_2$, $Al_2O_3$, etc.)/ Semiconductor (e.g. Si) |
| EAM (Absorption modulation) | N/A | Photonic | TCO (e.g. ITO)/ Oxide (e.g. $SiO_2$, $Al_2O_3$, etc.)/ 2D Material (e.g. Graphene) TCO (e.g. ITO)/ Oxide (e.g. $SiO_2$, $Al_2O_3$, etc.)/ TCO (e.g. ITO) |

All the different optical modes and capacitive gating schemes listed in this Table 2 can be used for both phase and absorption modulation and in conjunction with any feedback system also, not just limited to this table (e.g. ring resonators, Fabry-Perot cavities, coupled waveguides/resonators, etc.). All these schemes can be utilized in Photonic Integration Circuits (PICs) platforms including silicon photonics, silicon nitride photonics, III-V based photonics, polymer-based waveguide structures, any oxide or nitride based waveguide platform such as $SiO_2$ for example, or any-other material forming a waveguide including fiber-based structures.

Photonic ITO MZI

Turning to the drawings, FIG. 1 shows an ITO-based Mach Zehnder Interferometer (MZI) 100 having an active gating region and contacts. An optical MZI is shown, for example, in U.S. Patent Publication No. 2019/0072833, which is hereby incorporated by reference. Referring to FIG. 1(*a*), the MZI splits into two arms, each forming a photonic waveguide for the transmission of light. A first arm has the bottom electrode 102 to the Si waveguide for capacitive gating, lead line 104, and contact pad 106, all of which are formed of gold (Au) to make it lossy and offset optical losses. The capacitor bottom contact 102 contacts at least a portion of the first arm. The lead line 104 extends between the capacitor 102 and the contact pad 106, which is connected to ground. The metal (Au) on un-modulated arm serves as a contact 106 for the capacitor while adding necessary loss for balancing the device. FIG. 1(*b*) shows an optical microscope image of the fabricated device showing the active modulation region and contacts. The dashed white outline marks the patterned 10 nm ITO thin film designating the active device region on top of the corresponding Si waveguide (actively modulated arm of the MZM).

As further shown in FIG. 1(*a*), the second arm of the MZI 100 includes a second electrode 112, for example a phase modulator on an $Al_2O_3$ gate oxide 114, phase modulator contact or contact pad 116, and an Au contact or contact pad 118 for the MOS stack. The phase modulator 112 can be any suitable element that modulates the phase of light traveling through the arm waveguide. In the current example embodiment, the phase modulator is an optical index modulator that changes the index of refraction of light traveling through the arm waveguide with electrostatic gating, and is specifically shown with the active material ITO. For example, a voltage can be used to control the capacitive charging/discharging of the phase modulator 112, which in turn changes the optical index in the waveguide (i.e., the effective index of refraction of the waveguide changes), which in turn changes the phase of the light traveling in the arm waveguide. Thus, (Si) forms a first electrode and the ITO phase modulator 112 forms a second electrode for the capacitor 102.

The light in each arm are in-phase when the loss in each arm is equal so that the light combines where the arms join and provide the MZI output. If the arm are out-of-phase, there will be a partial or complete loss of light when the arms combine.

The gate oxide 114 contacts and covers or surrounds at least a portion of the second arm, and the ITO 112 contacts and covers or surrounds at least a portion of the gate oxide 114. A lead line extends between the ITO and the ITO contact pad 116. The contact 118 contacts and is on top of the ITO contact pad 116, and a drive voltage $V_d$ is applied to the contact 118. The Au contact 118 is on top of the ITO contact 116, as shown. The etched oxide opening on top of the metal pad 108 (FIG. 1(b)) on the bottom Si contact 106 can be noticed from the color contrast difference. As further shown, the contacts 106, 104, 102, gate oxide 114 and ITO layer 112 can be formed from thin layers.

Two metal contact pads 106, 118 side by side are deposited on both contact areas to facilitate biasing (marked with Au). The ITO contact 116 is used to administer the voltage, while the bottom Si contact 106 is grounded. TM-optimized grating couplers are used to couple the light from (to) the fiber into (out of) the MZM. Relevant parameters are length of the metal contact on Si, $L_m$=3.7 μm; active device length, L=32 μm; thickness of the deposited ITO thin film, $t_{ITO}$=10 nm; thickness of the $Al_2O_3$ gate oxide, $t_{ox}$=10 nm; waveguide height, h=220 nm; and width, w=500 nm.

Turning to FIG. 1(c), a Scanning Electron Microscope (SEM) image illustrates the fabricated device showing the deposited ITO thin film over the Si waveguide in the active modulation region. Atomic Layer Deposited (ALD) $Al_2O_3$ is everywhere on top of the waveguide and underneath the ITO film. A focused ion beam (FIB) SEM cross section of the active device revealing the oxide/ITO capacitive stack on top of the Si waveguide is shown as an inset.

Figure 1D:
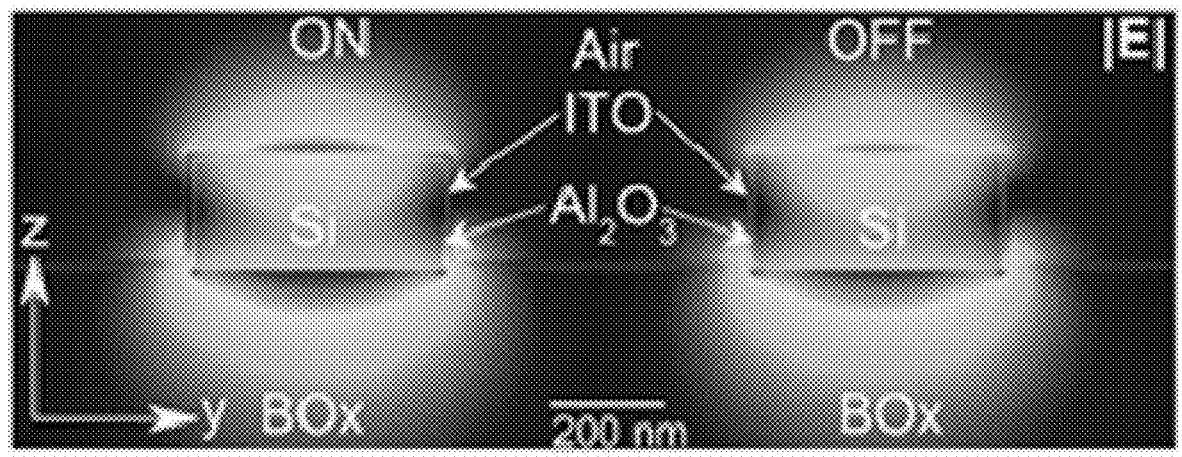
FIG. 1(d) is Finite Element Method (FEM) Eigenmodes of the active device corresponding to the ON and OFF states of modulator operation.

FIG. 1(d) depicts the finite element method eigenmodes for the active region cross-section (inset, FIG. 1(c)) for the ON and OFF states of operation showcasing the electric-field in the cross-sectional structure revealing the effective light confinement in the arm waveguide under electrical bias.

Figure 2A:
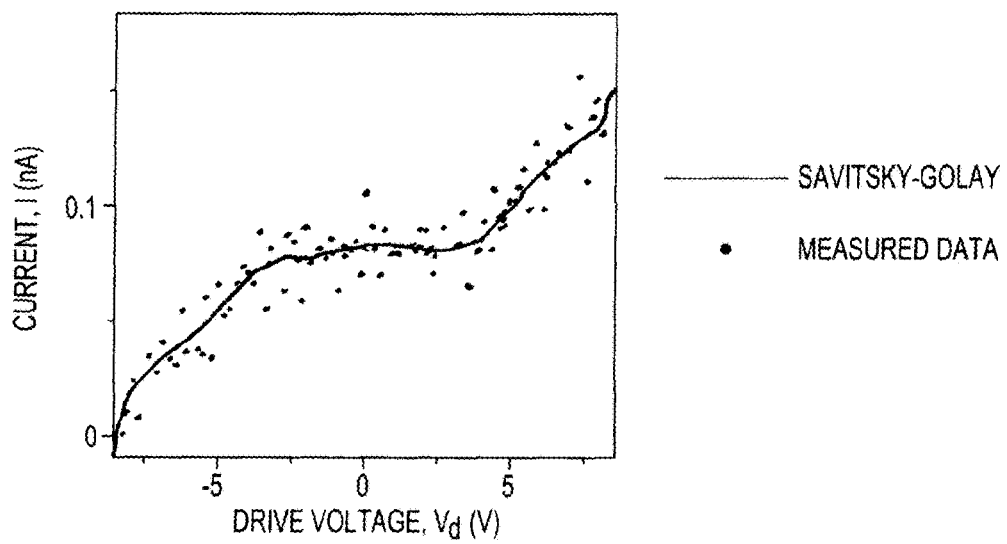
FIG. 2(a) is a graph of I-V measurements.
Figure 2B:
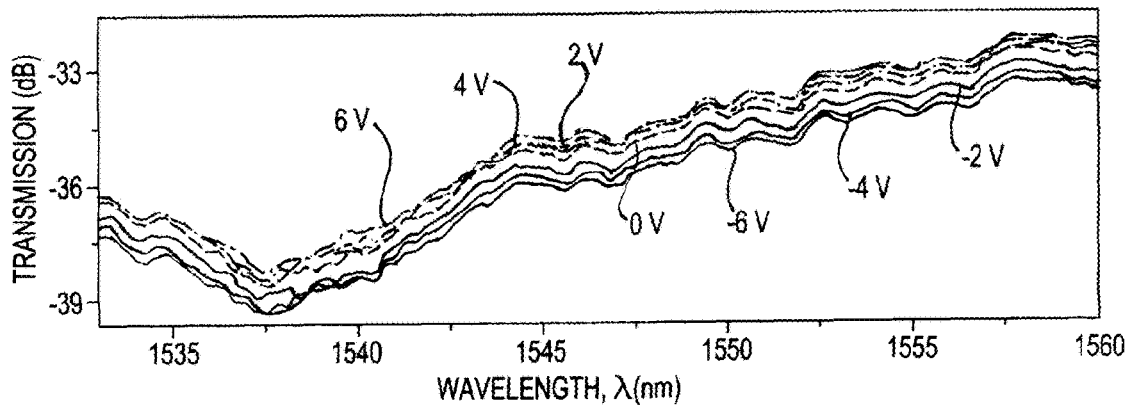
FIG. 2(b) is a graph of the transmission spectra.
Figure 2C:
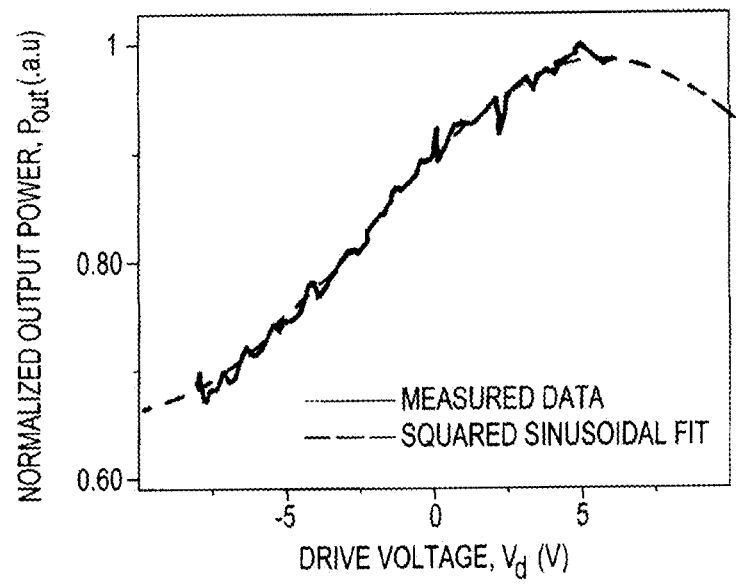
FIG. 2(c) is a graph of the normalized output optical power vs. drive voltage.
Figure 2D:
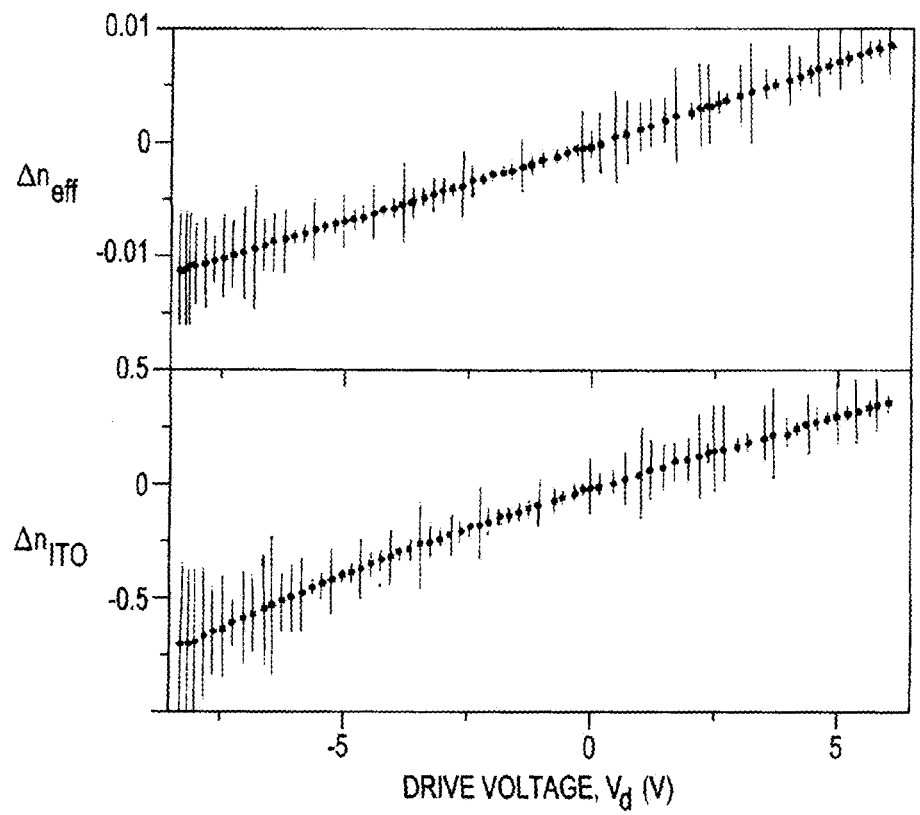
FIG. 2(d) is a graph of the extracted effective index change and ITO material index change vs. drive voltage.

FIG. 2(a) shows I-V measurements of the fabricated device. A Savitzky-Golay smoothing function has been applied on the measured data to showcase the I-V characteristics of the device. FIG. 2(b) shows the transmission spectra (in dB) of the device for varying drive voltages vs. wavelength, λ (nm). The transmission includes all the passive component losses including the grating couplers, Y-junctions, bent waveguides, etc. FIG. 2(c) shows normalized output optical power, $P_{out}$ (a.u.), vs. drive voltage, $V_d$ (Volts); the dashed line represents a squared sinusoidal fit [$cos^2$(arg)] suggested by the underlying physics of the MZ scheme. FIG. 2(d), top, shows extracted effective index change, $\Delta n_{eff}$, and FIG. 2(d), bottom, shows ITO material index change, $\Delta n_{ITO}$, with applied bias, $V_d$ (Volts), corresponding to modulation effects; the ITO index observes near unity order change with applied bias.

Figure 3A:
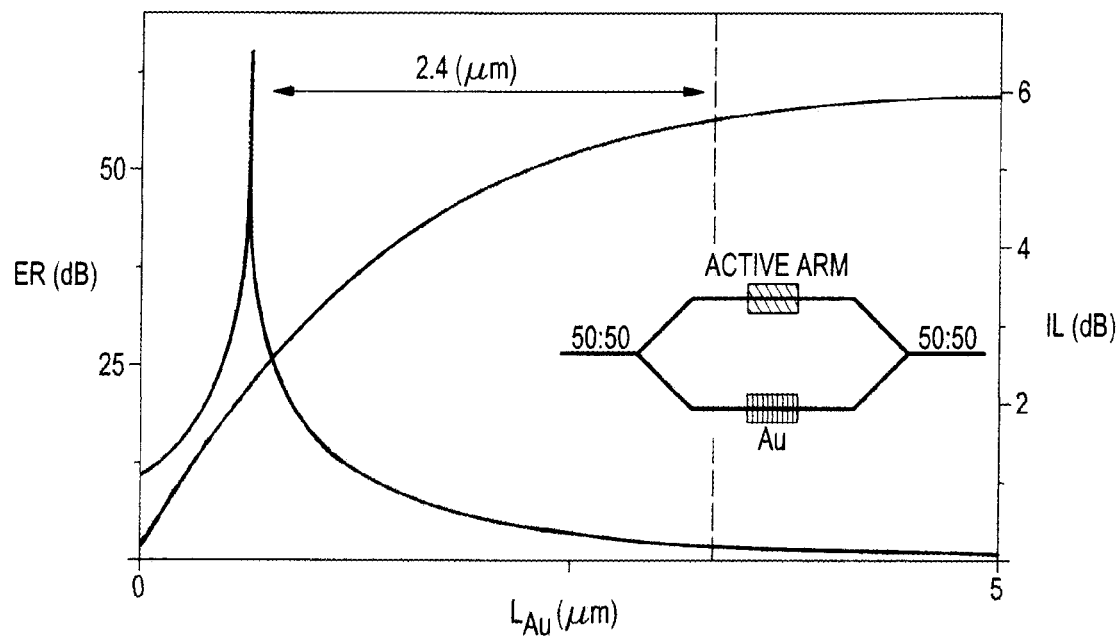
FIG. 3(a) shows balancing loss by depositing Au on the passive MZI arm to maximize the Extinction Ratio (ER)
Figure 3B:
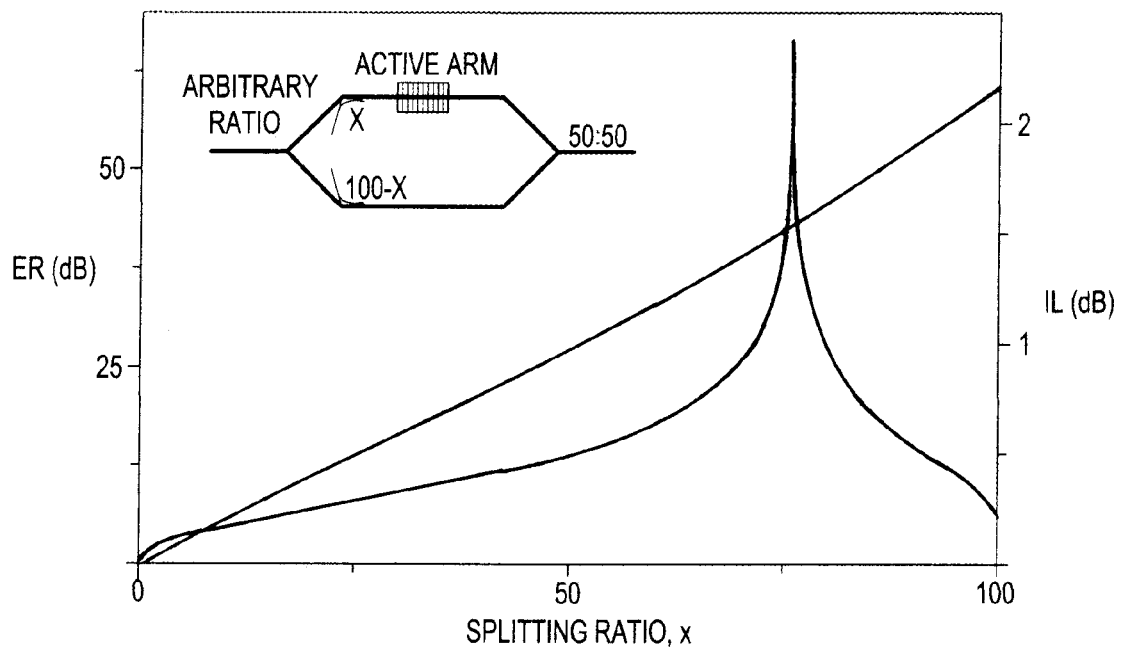
FIG. 3(b) shows the ER maximization technique with Y-junction splitting optimization where the Insertion Loss (IL) is minimized.

FIG. 3 shows extinction ratio, ER, and insertion loss, IL performance for two different loss-balancing methods. FIG. 3(a) shows that the loss is balanced by depositing Au on the passive (un-modulated) arm to maximize the ER; however, due to the ohmic loss nature of metal, the IL is higher compare to the second method. The dashed line indicates the operating region for the present device, and additional 2.4 μm of Au can be deposited on the active arm to increase ER whereas IL would also increase simultaneously. FIG. 3(b) shows the first Y-branch has arbitrary ratio to maximize ER, where the IL is also minimized since no extra loss induced on the passive arm. The splitting ratio denotes the power distribution on the active arm in x percentage.

Returning to FIG. 1(a), the MZI output will be OFF when the light from each arm is out-of-phase (i.e., offset by 180 degrees), since the light from each arm will cancel each other. And it will be ON when the light on each arm is in-phase. The ITO 112 changes the index of refraction to adjust the phase of light and control the ON/OFF of the MZI under electrical bias.

Thus, the inherent loss imbalance between the arms due to fabrication imperfections is a challenge in MZM schemes, which limits achievable extinction ratio (ER) defined as the ratio between maximum and minimum output power. It originates from the complex part of the optical phase and leads to degraded optical signal fidelity (i.e. phase errors at the output and alter frequency chirps). Intrinsically, phase shifting impacts both the real and imaginary parts (i.e. K-K relations), thus the loss imbalance can alter during MZM operation between the ON/OFF states. The arm loss imbalance can be improved by tuning the MZM arm losses statically. However, a challenge in using an inherently lossy material such as ITO, in an interferometric scheme similar to the MZ configuration to achieve satisfactory modulation depth, is to match the amplitude of the optical signal (i.e. loss) in both arras of the MZ; the interference from both arms at the output terminal converge referred to hereafter as balancing.

The passive MZI 100 is built on a silicon-on-insulator (SOI) substrate with the same waveguide lengths in both the arms, where subsequent process steps towards the active device include depositing ITO on top of a portion of one arm separated by an oxide layer to facilitate gating, as shown in FIG. 1. A symmetrical passive MZI (i.e. same length for both arms and 50/50 Y-splitters on both sides) is chosen so that the interference pattern at the output can distinguishably confer modulation effects from our active ITO device. The MZM system can be simplified by combining the field loss and phase shifts through each arm. The output field is then a simple function of the input field given by $$E_{out} = E_{in}(a_1 e^{-i\phi_1} + a_2 e^{-i\phi_2}) \quad (1)$$

where $a_1$ and $a_2$ are the field gain (loss) in each arm of the MZI and $\phi_1$ and $\phi_2$ are the phase induced through each of the arms (active/modulated and un-modulated), respectively. The input and output fields are denoted by phasor quantities, i.e. $E = Ee^{i\omega t}$, assuming there is no gain in the system, $(a_1+a_2)^2 \leq 1$.

The time-dependent transfer function for the light intensity (or power) using the slowly-varying envelope approximation (modulation frequency<<optical carrier frequency) expressed as $$T = \left|\frac{E_{out}}{E_{in}}\right|^2 = a_1^2 + a_2^2 + 2a_1 a_2 \cos\Delta\phi \quad (2)$$

where $\Delta\phi$ is the phase difference between the arms, $\Delta\phi=\phi_1-\phi_2$. To maximize the obtainable ER, i.e. ensuring minimal zeros in the OFF state, the field losses in both arms need to be matched, i.e. $a_1=a_2$.

Deviations from this ideal case are typically attributed to imperfect 50/50 Y-couplers. However, it is critical to emphasize that deviation from $a_1=a_2$ can be a result from differences in the losses anywhere in the MZM configuration including possible fabrication imperfections. In contrast, higher index change materials (e.g. ITO) do accompany significant loss as a byproduct of modulation and as such both the states of operation need to be accounted for in design considerations.

The extinction ratio (ER) is the ratio of the transmission between the ON ($T_{max}$) and OFF state $T_{min}$), i.e. static ER since it is measured by varying a DC phase bias to one of the arms to find the absolute maximum and minimum transmission. This is necessary since the dynamic ER may be reduced when operating at high frequencies due to limited phase swings or pulse shaping from the finite bandwidth of the electrodes. This upper bound can be referred to as the maximum extinction ratio, $ER_{max}$. Defining $\gamma=a_2/a_1$ as the field loss imbalance in the ON-state and, similarly $\gamma'=a'_2/a_1$ for the OFF state, where $a'_2$ denotes the OFF-state field loss since the change in field loss is not negligible for ITO resulting from the K-K relations, the maximum extinction ratio can be expressed as, $$ER_{max} = \left(\frac{1+\gamma}{1-\gamma'}\right)^2 \quad (3)$$

Here, the field losses can be approximated as, $a=e^{-\alpha L}$ where L is the device length and the absorption due to the altered ITO material is a $\alpha=2\pi\kappa_{eff}/\lambda$; where $\lambda$ is the operating wavelength, and $\kappa_{eff}$ is the imaginary part of the effective index. With the aim to aim for $ER_{max}$ and adjusting for both states of operation, we calculate the desired length of the metal contact, $L_m$ on the un-modulated arm of the MZM, and chose to deposit metal (Au) on the other (un-modulated) arm of the MZM (FIG. 1) for two reasons: (a) it acts as our bottom electrode in the metal-oxide-semiconductor (MOS) stack (i.e. the Si waveguide is lightly doped); and (b) imposes necessary loss on the un-modulated arm to facilitate modulation depth, i.e. balancing the loss in both the arms.

When ITO is packaged as one electrode of an electrical capacitor, applying bias voltage can put the capacitor into the three known states of accumulation, depletion, or inversion, thus changing the carrier concentration. The optical property of the active material therefore changes significantly, resulting in strong optical modulation. In praxis, a 1/e decay length of about 5 nm has been measured before, and modulation effects have been experimentally verified over $1/e^2$ (~10 nm) thick films from the interface of the oxide and ITO. In order to extract relevant parameters including the effective indices (real and imaginary parts, $n_{eff}$ and $\kappa_{eff}$) and confinement factors, $\Gamma$, we perform FEM eigenmode analysis for our structure (FIG. 1). The first order transverse magnetic (TM)-like mode is selected following the TM-optimized grating couplers in the fabricated device and the mode profiles indicate an increase in the light confinement with modulation by 41% which is aligned with results from our previous work as we operate away from the ENZ point in the n-dominant region (FIG. 1).

Since the modulation efficiency ($ER/V_{pp}$) is improved for better electrostatics, we use a relatively high-k dielectric, $Al_2O_3$, for the gate oxide of 10 nm using atomic layer deposition (ALD), followed by 10 nm of ITO on the device region (ion beam deposition (IBD)). The latter has synergies for processing ITO as this process yields dense crystalline films that are pinhole-free and highly uniform, and allows for a room temperature process, which does not anneal ITO (i.e. no activation of Sn carriers as to facilitate electrostatic EO tuning). Incidentally, IBD technologies are advantageous for nanophotonic device fabrication due to their precise controllability of material properties such as microstructure, non-stoichiometry, morphology, crystallinity, etc.

Results show a modulation depth (i.e. ER) of ~2.1 dB for a phase shifter length of only (FIG. 2). The voltage needed for $\pi$-phase shifts at the output is about 16 V (FIG. 2) gives a corresponding $V_\pi L$ of just 0.52 V·mm. The output intensity of the MZ configuration is governed by $$I \propto |E|^2 \propto \cos^2\left(\frac{\Delta\beta L}{2}\right) \quad (4)$$

where, the output intensity is normalized such that the peak transmission factor is 1 for ideal power transmission, $\Delta\beta$ is the induced change in the propagation constant, $\beta$ between both arms during modulation. I-V measurements of the device exhibit active capacitor operation in the reported range away from capacitor saturation region or gate oxide breakdown (FIG. 2).

The small non-zero current at 0 V corresponds to the capacitor charging effects from the continuous bias sweeping measurement. The change in the effective index of the waveguide, $\Delta n_{eff} \approx 0.020$, for ON/OFF modulation is estimated using the applied voltage, $V_d$ and the material index change in the ITO, $\Delta n_{ITO}$ from FIG. 2, which closely matches the value obtained from the FEM analysis (~0.023). The effective index change with modulation can be found by a linear approximation with applied voltage as $\partial n_{eff}/\partial V_d \sim 1.407 \times 10^{-3}$ $V^{-1}$. Both the effective index change, $\Delta n_{eff}$ and material index change in ITO, $\Delta n_{ITO}$ exhibit monotonic increase with applied bias in our experimental voltage range. This is expected as we operate in the n-dominant region of the ITO material far from any ENZ effects. Note, the change in both the indices correspond to a decrease in the corresponding indices as modulation assimilates to blue-shifts in device resonance, however is hardly resolvable in our single pass MZ configuration (FIG. 2), but is well-known from ring resonators, photonic crystal cavities or any Fabry-Pérot cavity.

The weak dispersion of $\partial n_{eff}/\partial \lambda \sim 1.12 \times 10^{-4}$ $nm^{-1}$ in our modal structure contributes to the undistinguishable resonance shift in the transmission spectra. The modal dispersion is calculated from Eigenmode analysis. The material index change in ITO, $\Delta n_{ITO}$ shows near unity order index change as demonstrated for this emerging material (FIG. 2), which is significantly higher as compared to its Si counterpart while both (ITO and Si) operate with the free carrier modulation mechanism. This improvement of ITO can be attributed to: (a) 2-3 orders higher carrier density, and (b) the higher bandgap, which consequently leads to a lower refractive index. If the change of the carrier concentration $\delta N_c$ (e.g. due to an applied voltage bias) causes a change in the relative permittivity (dielectric constant) $\delta\varepsilon$, the corresponding change in the refractive index can be written as $\delta n = \delta\varepsilon^{1/2} \sim \delta\varepsilon/2\varepsilon^{1/2}$; hence, the refractive index change is greatly enhanced when the permittivity, $\varepsilon$ is small. The noticeable change from the monotonic effective indices trend originates from modal confinement increasing with bias, i.e. as we tune towards the ENZ region the confinement increases without actually biasing it to the ENZ region.

The simple biasing scheme used here to repurpose the Si waveguide as a bottom contact in the MOS-stack, however, severely limits modulation speed of this device due to high electrical resistance; the epi-Si layer of the SOI substrate is only lightly doped thus $R_{Si}$~600 MΩ. The contact and sheet resistance of the ITO film is ~220Ω and 63 Ω/□, respectively. The resistivity and mobility of the ITO film is measured to be $6.36\times10^{-4}$ Ω-cm and 42.6 cm$^2$/V·s, respectively. The device capacitance is ~170 fF and hence projected speed is only ~1.5 kHz. Because of the design decision to employ the Si-contact on the un-modulated arm, the device is resistance (R)-limited, which could be further optimized by Si selective doping (about 2 orders of magnitude) and bringing the Si contact closer to the active region.

Selective plasma treatments on the ITO contact region can avail lower contact resistances up to another 2 orders of magnitude. The switching speed of such modulators are essentially limited by the dynamics of majority carriers in the ITO film and optimally speeds in GHz ranges should be feasible as demonstrated in other majority carrier based devices. Hall effect measurements revealed the carrier concentration of the as deposited ITO film, $N_c=2.29\times10^{20}$ cm$^{-3}$. The change in the carrier concentration level arising from active capacitive gating is calculated as $\Delta N_c=1.1\times10^{20}$ cm$^{-3}$ utilizing both accumulation and depletion mechanisms depending on applied bias considering the 10 nm block of the ITO material.

In addition, an analysis of ITO's modulated carrier concentration profile can be implemented using the modified Thomas-Fermi approximation (MTFA) method characterized by the modified Thomas-Fermi approximate screening length, $\lambda_{MTFA}$~3 nm. MTFA allows for the quantum-mechanical influence of an infinite potential barrier at the surface and has shown compliance for semiconductors with surface band bending at the nanoscale. Even with MTFA, the carrier density change in our ITO accumulation layer is $\Delta N_c=3.6\times10^{20}$ cm$^{-3}$, resulting in carrier concentration levels from $4.9\times10^{19}$ cm$^{-3}$ to $4.1\times10^{20}$ cm$^{-3}$ corresponding to the capacitive gating which is still away from reported ENZ region of 6~$7\times10^{20}$ cm$^{-3}$. The dynamic switching energy is about 11 pJ/bit using capacitive charging.

The limited ER found indicates that the loss balancing in both of the arms are imperfect, which can be attributed as combinations of several factors such as the passive waveguides being non-identical (sidewalls, roughness, etc.), inadequate Y-splitters skewed astray from 50:50 ratio, fabrication conditions and imperfections, dissimilarity between the as deposited materials (e.g. ITO, Au, $Al_2O_3$) from used values in the FEM analysis or analytical expressions in design, film quality, non-uniformity of the oxide or metals, etc. The loss imbalance can be estimated form the visibility of the interferometric output. For imbalanced lossy MZ schemes the visibility can be written as $$v = \frac{1}{\cosh(\Delta\alpha_{bal}L_{bal})} \quad (5)$$

where, $\Delta\alpha_{bal}$ is the amount of loss (absorption) required to bring the system to balance and hence improve the ER, and $L_{bal}$ is the corresponding length needed of the imposed lossy material. We calculate the visibility of the fringes from our results as v=0.228, which leads to an imbalance factor $\Delta\alpha_{bal}L_{bal}$ of 2.16. This translates to ~2.4 μm of additional Au placed on the active arm to balance the loss and improve ER (FIG. 3(a)). However, this would further limit the output power by enhancing the insertion loss (IL) possibly refraining further detectable measurement.

Mechanisms to enhance device performances can include designing the input Y-splitter with a power splitting ratio to compensate the loss resulting as a byproduct of active modulation (FIG. 3(b)); i.e. evaluate an input Y-splitter with arbitrary splitting ratio, x in terms of the power flow into the active arm. Results show that an input Y-splitter with ~75% power flowing into the active arm can compensate for the modulation loss arising from K-K relations towards maximizing ER. Furthermore, this approach is beneficial in terms of the IL as it does not have to encounter any parasitic metallic loss as in the present design. Biasing the MOS-stack can propose a challenge in this configuration which can be addressed by a small protrusion of the Si waveguide underneath the active region with selective doping treatments to form a contact pad. Back reflection caused by such protrusion needs to be taken into account also which is not focused on here and can stimulate future research.

An increase in loss (i.e. decrease in output power) of about 6 dB from the passive to active device was found which is an upper bound IL for the active device. However, the actual IL of the device might be lower as this increase of loss refers to the change in loss from the unprocessed passive MZ structure to the active device after all processing and subsequent processing on the same chip is known to introduce additional loss with every process step (eg. patterning, liftoff etc.). The estimated efficiency-loss product of the device, $\alpha V_\pi L$ is about 80 dB·V at the ON state. This value is rather high for conventional low loss and low index variable active materials (e.g. Si, III-V, etc.), but comparable with emerging highly tunable material based devices such as graphene. This high value also reflects the loss balance imperfections; balanced schemes as shown in FIG. 3 could help to optimize this value down to comparable limits with conventional Si based schemes (~20 dB·V).

The present invention demonstrates the first ITO-based Mach Zehnder modulator on a Silicon photonics platform which can enable compact modulator footprint, ease of fabrication and attain CMOS compatibility. Our results confirm a near unity order index change in the ITO material upon applied bias and obtained a low $V_\pi L$ of 0.52 V·mm. Although the speed limitation in this work does not warrant data communication, such response rates (~ms) can avail applications in phased array systems which can be beneficial in emerging technology such as light detection and ranging (LiDAR) for terrestrial and areal localization and mapping. This invention provides pathways for future optimization schemes facilitating improved device performances including high-speed operation, enhanced modulation depth, and reduced insertion loss. to avail dense on-chip integration for data communication.

Plasmonic ITO Lateral Capacitor MZI

Figure 4A:
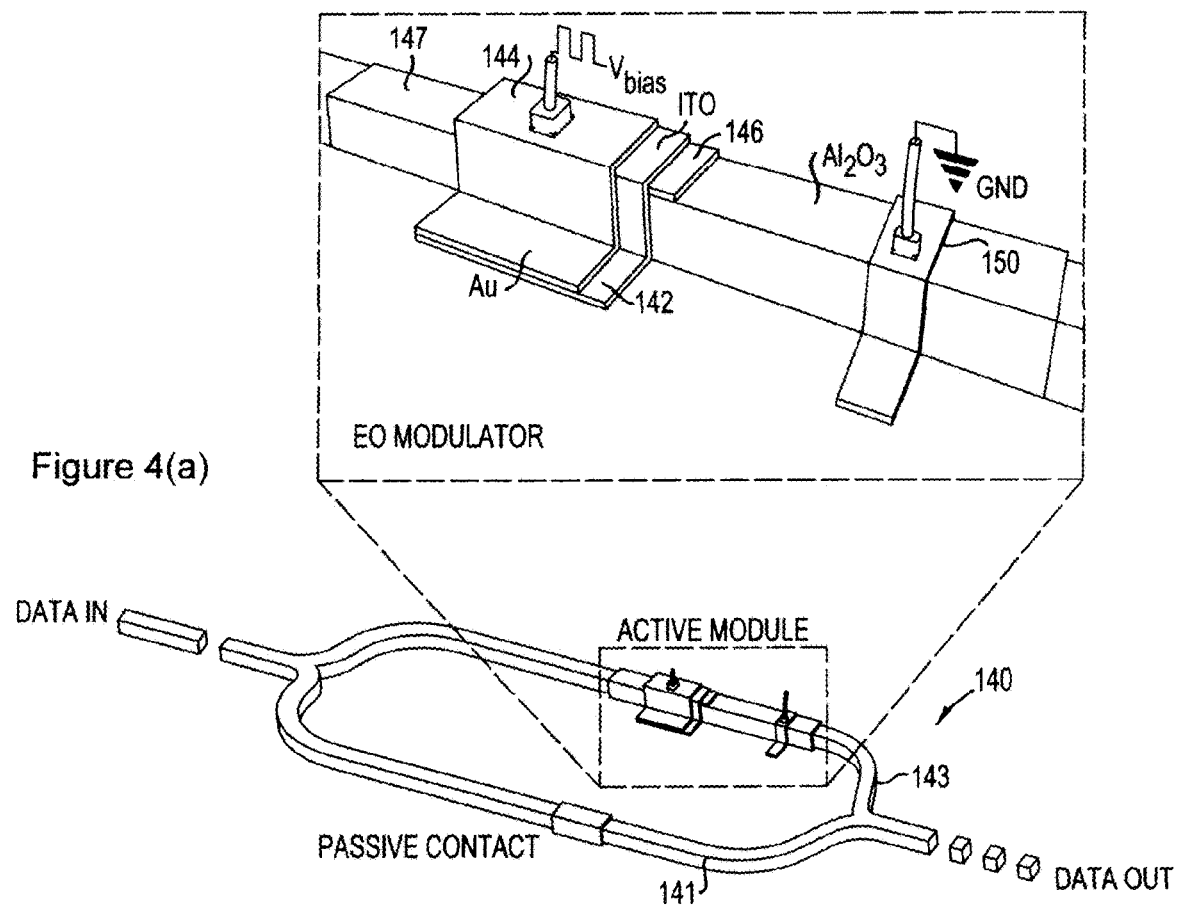
FIG. 4(a) a lateral MOS ITO based MZI in accordance with the invention.

FIG. 4(a) is a schematic representation of a lateral MOS ITO based Mach Zehnder interferometer 140 operating at λ=1550 nm. Here, the phase shifter length (between the contacts) is <2 μm. As shown, the MZI 140 is split to form a first arm 141 with a passive contact, and a second arm 143 with an active module. The active module includes a phase modulator 142, a biasing metal contact 144 on the phase modulator active material 142, a gate dielectric (oxide, $Al_2O_3$) 147, and a ground contact 150 for completing the lateral capacitor. The phase modulator can be any suitable element that modulates the phase of light traveling through the arm waveguide. In the current example embodiment, the phase modulator is an optical index modulator that changes the index of refraction of light traveling through the arm waveguide with functionally biasing the active material in this lateral capacitive configuration, and is specifically shown as ITO being the active modulation material.

The ITO 142 contacts and covers or surrounds at least a portion of the second arm 143, and the metal contact to the ITO 144 contacts and covers or surrounds at least a portion of the ITO 142. The ground contact 150 contacts and covers or surrounds at least a portion of the second arm 143 and is set apart from the ITO 142. The biasing contact 144 and ground contact 150 can be gold. The oxide layer 147 is partially etched near the active device region (right side of 142) to facilitate electrostatic field overlap from the active contacts 144 and 150 interacting favorably with the active material 142.

Figure 4B:
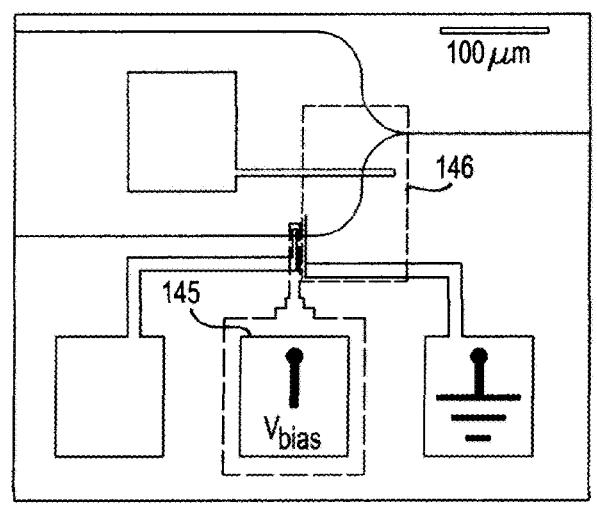
FIG. 4(b) shows an optical microscope image of the MZI of FIG. 4(a)
Figure 4C:
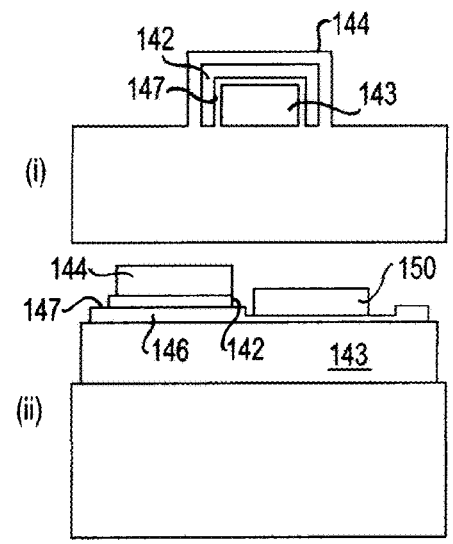
FIG. 4(c) shows cross-section views of the device of FIG. 4(a)

Thus, in FIG. 4(*a*), the ground 150 is on the same arm as the ITO metal contact 144, which provides a desired field shown in FIG. 5(*c*) and FIG. 5(*d*); whereas in FIG. 1(*a*) the ground is on a separate arm than the ITO and contacting the Si waveguide, which makes the capacitor configuration formed by the Si and ITO electrodes in FIG. 1(*a*) Si/oxide/ITO with a photonic mode whereas in FIG. 4(*a*) the capacitive stack is plasmonic metal/oxide/ITO laterally, and the capacitor is formed by the ITO and metal (ground) electrodes (FIG. 4(*a*)). A drive or bias voltage $V_{bias}$ is applied to the metal ITO contact 144, which transfers to the ITO 142, as shown. As further shown, the ITO 142, ITO contact 144, oxide layer 147, and ground contact 150 can be formed from thin layers.

FIG. 4(*b*) is an optical microscope image of the fabricated Mach Zehnder modulator with contact pads for biasing shown. The patterned ITO 145 and the partial oxide etched region 146 are highlighted with dashes. FIG. 4(*c*) shows schematic diagrams of the device in: (i) Cross-sectional view in the active ITO deposited region; and (ii) A longitudinal cross-section along the Si waveguide exhibiting the device region with the partial etched gate oxide region. The $Al_2O_3$ gate oxide is 10 nm thick, and partially etched down to 1-2 nm thickness in white dashed area in FIG. 4(*b*). Si waveguides are 500 nm×220 nm, deposited ITO layer is 10 nm thick.

To maximize the obtainable ER, i.e., ensuring minimal zeros in the OFF state, the field losses in both arms need to be matched, i.e., $a_1=a_2$. Deviations from this ideal case are typically attributed to imperfect 50:50 Y-couplers. However, it is critical to emphasize that deviation from $a_1=a_2$ can be a direct result from differences in the losses anywhere in the MZM configuration including possible fabrication imperfections. By contrast, higher index changeable materials (e.g., ITO) do accompany loss as a byproduct of modulation and as such both the states of operation need to be accounted for in design considerations. One can improve this arm loss imbalance by tuning the un-modulated arm losses statically to counteract the imbalances arising from the K-K relations. As such, we chose to deposit metal (Au) on the other (un-modulated) arm of the MZ (FIG. 4(*a*)) 141.

Since the modulation efficiency ($ER/V_{pp}$) is improved for better electrostatics, we use a relatively high-k dielectric, a 10 nm oxide layer of $Al_2O_3$ is grown on the passive structure using atomic layer deposition (ALD) to aid capacitive gating schemes. Subsequently, a 10 nm thin film of ITO is deposited using an ion beam deposition (IBD) process after necessary patterning using EBL and liftoff processes afterwards (FIG. 4(*b*), gray area underneath the right contact pad). The IBD process has synergies for processing ITO as this process yields dense crystalline films that are pinhole-free and highly uniform and allows for a room temperature process, which does not anneal ITO (i.e., no activation of Sn carriers as to facilitate electrostatic EO tuning). IBD technologies are advantageous for nanophotonic device fabrication due to their precise controllability of material properties such as microstructure, non-stoichiometry, morphology, and crystallinity.

A selective etch step of the ALD grown oxide near the active ITO device region is enacted to facilitate the electric field overlap from the contacts with the active ITO material 146 (FIG. 4(*b*)). Contacts and the plasmonic top layer are formed by depositing 50 nm of Au using electron beam evaporation process. An adhesion layer of 3 nm of Ti is used in the process. The other contact is placed in close proximity (<2 μm) to the plasmonic top contact in the partial etched region to maximize the electrostatic field overlap to the active ITO region (FIG. 4(*c*)(*i*)). The schematic of a longitudinal cross-section along the Si waveguide (active arm of the MZI structure) in the device region is illustrated in FIG. 4(*c*)(*i*) and a cross-sectional schematic of the active plasmonic ITO region is shown in FIG. 4(*c*)(*ii*). Another contact on the partial etched region is placed for determining the partial etch success; as we aimed for a remainder of just 1-2 nm thin oxide film after etch (FIG. 4(*b*)), this contact provided the control to determine if etched all the way through to the conductive Si layer.

The pattern transfers were performed in EBL using the Raith VOYAGER tool with PMMA based photoresists, and MIBK:IPA (1:3) developer for 60 s. 50 nm of Au for contacts and the plasmonic top layer in the mode structure were deposited using an e-beam evaporation system (CHA Criterion) as Au has reasonably low ohmic loss at near IR wavelengths. An additional 3 nm adhesion layer of Ti was used in the contacts. The $Al_2O_3$ oxide was deposited using the ALD technique as it provides reliable and repeatable performance characteristics. The Fiji G2 ALD tool was used at low temperature settings (100° C.) for 100 cycles to deposit about 10 nm of $Al_2O_3$ to ensure higher film quality devoid of any pinholes or surface traps. A Filmetrics F20-UV system was used to characterize the $Al_2O_3$ deposition rate.

An etch step was required for the partial etch near the active device region to facilitate the necessary height contrast between the plasmonic top contact and the lateral bottom contact in the MOS-stack. We used a rather slow wet etch process for $Al_2O_3$ using an MF319 solution in the area of interest (near active ITO region, keeping both contacts sufficiently close in proximity without jeopardizing etching on the extended active ITO region). Note, MF319 contains tetramethylammonium hydroxide (TMAH), which reacts with the Al and can etch the oxide thereof.

Experimental measurements of the device show a working capacitor in the measured voltage range, not showing any observable saturation of the MOS capacitor or breakdown of the gate oxide characteristics (FIG. 5(*a*)). Electro-optic transmission power tests via a gated-transmission measurement exhibit reasonable modulation of the laser power demonstrating a modulation depth (i.e. ER) of ~1.34 dB in the measured bias range, and a squared cosine fit (as dictated by the underlying physics of MZIs from Eq. (4)) can obtain an ER of 2.2 dB. The quality of the fit symbolized by the coefficient of determination ($R^2$) is 0.86. The voltage needed for π-phase shifts at the optical output is about 33 V (FIG. 5(*b*)) and a corresponding $V_\pi L$ of just 63 V·μm given the <2 μm-short phase shifter.

Thus, FIG. 5(*b*) shows normalized output optical power, $P_{out}$ (a. u.) vs. bias voltage, $V_{bias}$ (Volts) demonstrating the modulator performance, the experimental data was fit with a squared sinusoidal ($cos^2(arg)$) fit to extract the half-wave voltage, $V_\pi \approx 33$ V. FIG. 5(a) shows I-V measurements of the ITO-oxide-metal lateral capacitive stack; a Savitzky-Golay smoothing function was applied on the experimental data to showcase the I-V characteristics. FIG. 5(c) shows FEM simulation of the longitudinal cross-sectional device region revealing electrostatic field overlap with the active ITO in the device region arising from bias. FIG. 5(d) shows detail of the field line interaction with the ITO layer. The line plot represents the carrier concentration, which is low at ground and high at (above and below) the ITO.

Figure 5A:
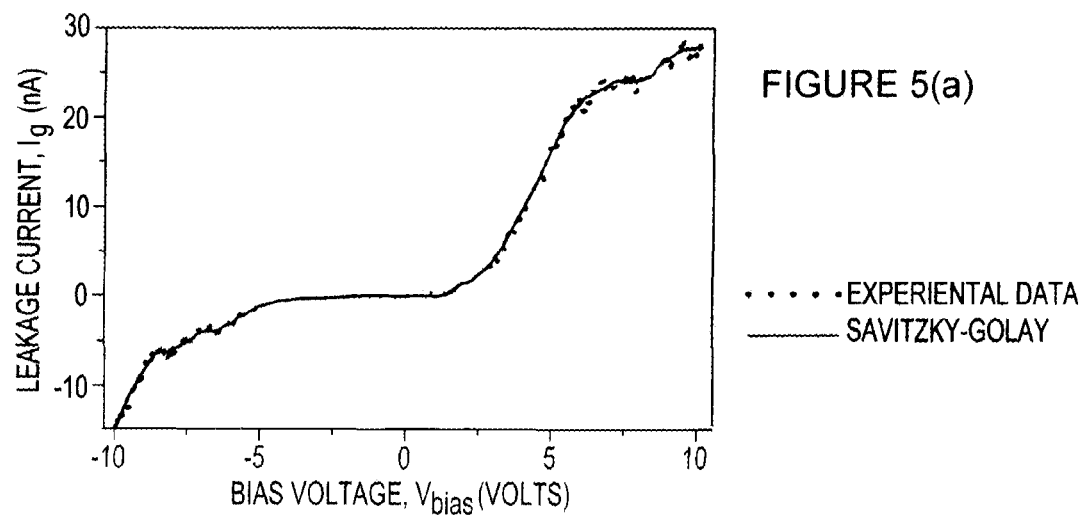
FIG. 5(a) is a graph of measurements.
Figure 5B:
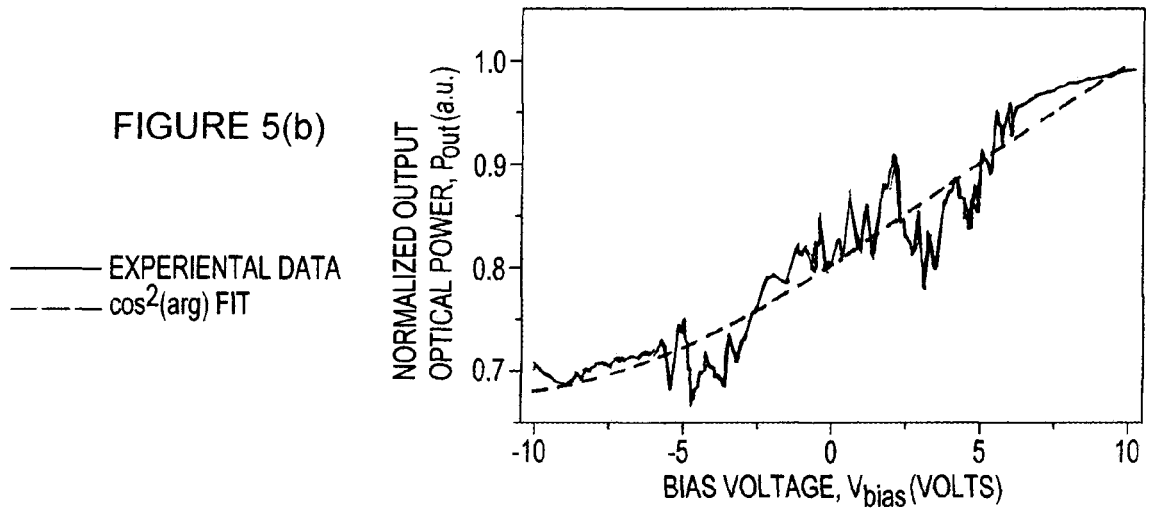
FIG. 5(b) is a graph of normalized output optical power vs. bias voltage.
Figure 5C:
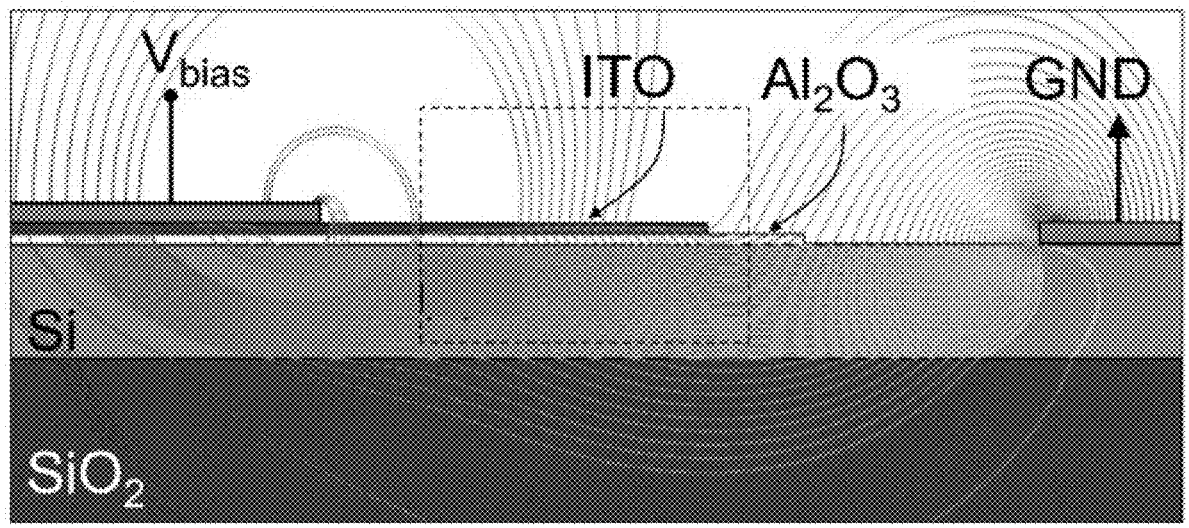
FIG. 5(c) shows FEM simulation with electrostatic field overlap.
Figure 5D:
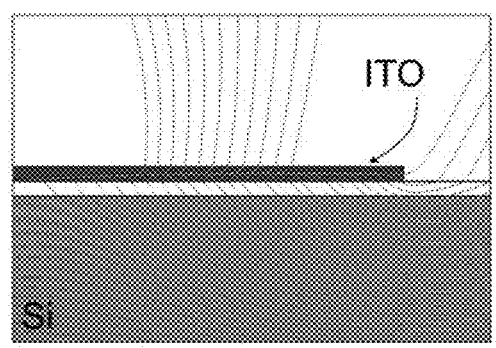
FIG. 5(d) shows field line interaction with the ITO layer, a magnified view of FIG. 5(c) in the area of interest.

In order to gain more insights into the field-distribution of this lateral-gated modulator, finite element method (FEM) simulations are carried out to resolve the electrostatic field overlap with the active ITO arising from capacitive gating which confirms an increased field overlap due to the partial etching of the oxide (FIGS. 5(c), 5(d)). Here we use the aforementioned carrier concentration of $2 \times 10^{20}$ cm$^{-3}$ and $1 \times 10^{14}$ cm$^{-3}$ for ITO and Si, respectively. The plasmonic optical confinement in the active region further acts to amplify the material index change into obtainable effective modal index variation; hence aiding the overall modulation depth arising from both effects (traditional plasmonics and improved electrostatics in the lateral configuration). As both plasmonic top contact and the bottom contact in the capacitive stack are only metal paths, there is little resistance leading up to the device region; so, such a device is only limited by the capacitance (not R-limited) in terms of attainable speed. Selective plasma treatment on the ITO contact region can avail lower contact resistances up to 2 orders of magnitude. The switching speed of such modulators are essentially limited by the dynamics of majority carriers in the ITO film, and optimally, speeds in GHz ranges should be feasible as demonstrated in other majority carrier-based devices.

Plasmonic ITO MZI Vertical Capacitor

The plasmonic design for a vertically configured capacitor is shown in FIG. 6 and provides commensurate performance in terms of the FOM. The low contact resistance can help bring down the R-limited threshold for the photonic structure in the ITO/oxide/ITO and metal/oxide/ITO structures; essentially enabling high speed operation. FIG. 6(a) is a schematic representation of cross-sectional structures for both arms of an MZI; the top for the passive contact region for balancing the loss in both waveguide outputs and the bottom for the active capacitive region. FIG. 6(b) is a plasmonic vertical MOS ITO based Mach Zehnder Interferometer 164 operating at $\lambda=1550$ nm. Here, the phase shifter length is the actual device 165 length.

As shown, the MZI 164 is split to form a first arm 155 with a passive contact 156, and a second arm 158 with an active module. The active module includes a phase modulator 165, a biasing metal contact 162 on the phase modulator active material 159, a gate dielectric (oxide, $Al_2O_3$) 160, and a ground metal contact 157 for completing the vertical capacitor. The phase modulator can be any suitable element that modulates the phase of light traveling through the arm waveguide.

In the current example embodiment, the phase modulator is an optical index modulator that changes the index of refraction of light traveling through the arm waveguide with functionally biasing the active material in this vertical capacitive configuration with the ITO 159 as one electrode and the metal 161 as the second electrode separated vertically by an oxide layer 160, and is specifically shown as ITO being the active modulation material. The ITO 159 contacts and covers or surrounds at least a portion of the second arm 158, and the metal contact to the ITO 162 contacts and covers or surrounds at least a portion of the ITO 159 away from the waveguide 158 (FIG. 6(c)). The ground contact 157 contacts and covers or surrounds at least a portion of the second arm 158 and is set on top the ITO 159 separated by a gate oxide, $Al_2O_3$ 160. The biasing contact 162 and ground contact 157 can be gold. The TCO material being conductive forms a vertical capacitor stack (i.e. the phase shifter 165 here) on top of the waveguide 158.

Thus, in FIG. 6(c), the ground 157 is on the same arm as the ITO metal contact 162, which provides a desired vertical capacitance to induce the phase change in the waveguide 158; whereas in FIG. 1(a) the ground is on a separate arm than the ITO are contacting the Si waveguide, which makes the capacitor configuration in FIG. 1(a) Si/oxide/ITO with a photonic mode; and in FIG. 4(a) the capacitive stack is plasmonic metal/oxide/ITO laterally; whereas here in FIG. 6 the capacitor and optical mode combination is plasmonic and in vertical metal/oxide/ITO formation. A drive or bias voltage $V_{bias}$ is applied to the metal ITO contact 162, which transfers to the ITO 159. As further shown, the ITO 159, ITO contact 162, oxide layer 160, and ground contact 157 can be formed from thin layers.

Figure 6E:
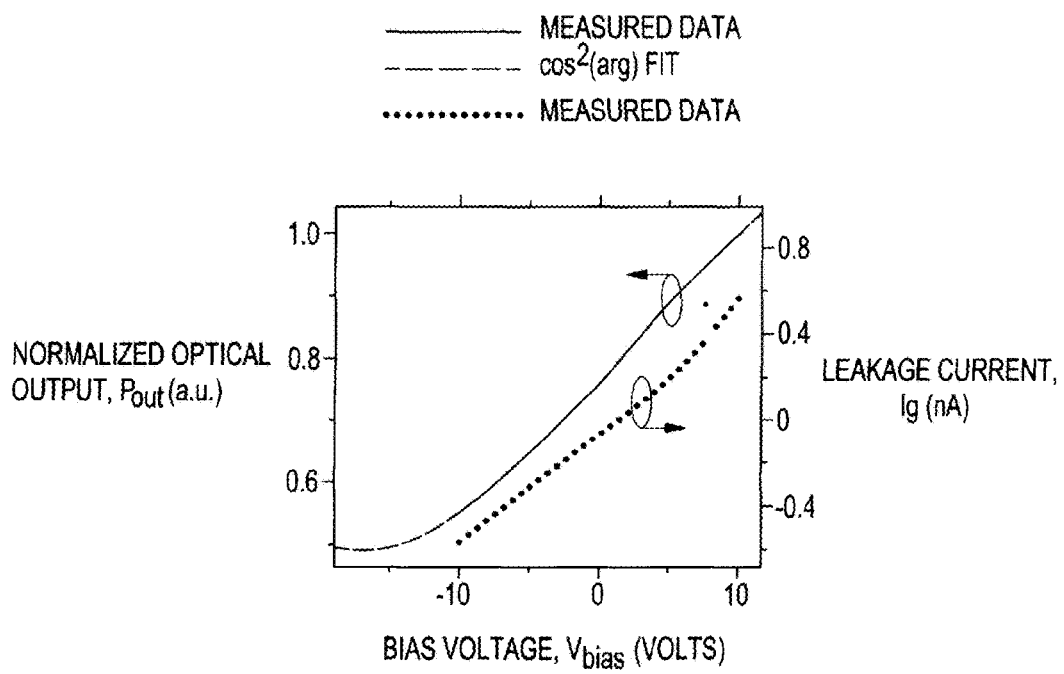
FIG. 6(e) is a graph of normalized output power vs. bias voltage, and I-V measurements.
Figure 6F:
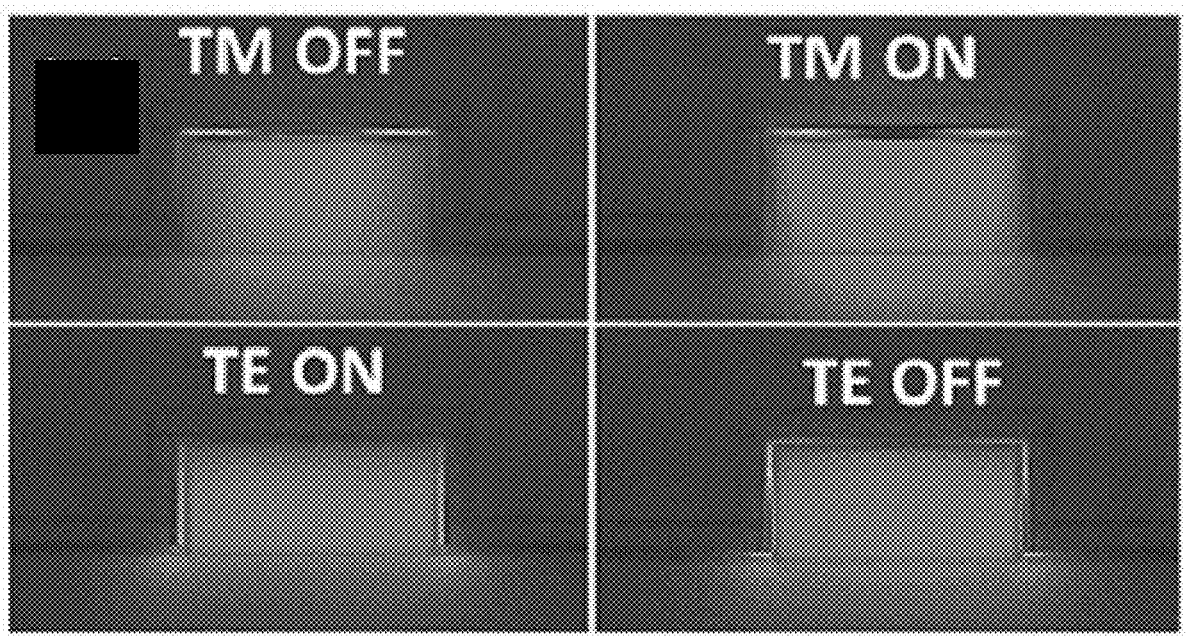
FIG. 6(f) shows FEM eigenmodes for differently polarized modes corresponding to the ON and OFF states of modulator operation.

FIG. 6(d) is an optical microscope image of the fabricated Mach Zehnder modulator with contact pads for biasing shown. The patterned ITO 159 and the ITO contact 162 and the plasmonic top metal 161 and the metal contact 157 are shown (FIG. 6(d)). Si waveguides are 500 nm×220 nm, deposited ITO layer is 10 nm thick and the $Al_2O_3$ oxide layer is 20 nm thick. FIG. 6(e) shows the modulation performance indicated by the varying normalized optical output with bias voltage at almost 3 dB. A squared sinusoidal fit, as dictated by the underlying mechanism of MZIs in Eq. (4), is employed to ascertain the half-wave voltage of ~38.3 V. The corresponding FOM, $V_\pi L$ is miniscule at 95 V·μm showcasing the effective modulation in this vertical MOS-capacitor plasmonic configuration with a compact device length of just 2.5 μm. FIG. 6(e) also depicts the I-V characteristics of this vertical capacitor in the measured voltage range assuring working capacitor traits away from any saturation or breakdown regions. FIG. 6(f) shows FEM eigenmodes of the active device cross-section for TE and TM modal polarizations in the vertical capacitive plasmonic structure corresponding to the ON and OFF states of operation.

1-D ITO PCNB

Turning to FIG. 7, a vertical Silicon slot waveguide is shown, with a thin ITO film provided in the dielectric slot gap region. FIG. 7 is a schematic of the 1-D vertical slot ITO PCNB cavity with air holes, in which FIG. 7(a) is a 3D perspective view, FIG. 7(b) is a top view, and FIG. 7(c) is a side view (longitudinal cross-section) showing the mirror section and tapered section holes forming the Fabry-Pérot-like cavity. As shown, the waveguide is formed with a top Si layer, then an $HfO_2$ layer, then an ITO layer, then an $HfO_2$ layer, then a bottom Si layer constituting the vertical Si slot.

The air holes can extend the entire width through the waveguide, from the top to the bottom, and through all of the intermediary layers. The air holes can all be the same size and shape and spaced evenly along the length of the waveguide, or can be different sizes and/or shapes and/or distances from each other. Thus, as shown, the waveguide can have end sections with holes of equal size, then a middle tapered section with holes of gradually smaller size. In one embodiment, the cavity length, $L_{cavity}=100$ nm, hole period of mirror section, a=365 nm; minimum hole distance of taper section, $a_{min\_taper}$=230 nm; hole radius, r=0.28a; number of taper hole pairs, n=14; number of mirror hole pairs, m=18; waveguide height, h=320 nm. The cross-sectional mode structure with the ITO thin film sandwiched between two p-Si claddings with oxides on either side for electrostatic gating are shown magnified as an inset to FIG. 7(c). The relevant parameters are: W=300 nm, $h_{Si}$=150 nm, $d_{ox}$=5 nm, and $d_{ITO}$=10 nm.

This modal configuration allows the slot waveguide mode to be tightly confined to the active (ITO) region. In fact, such semiconductor-insulator-semiconductor (SIS) mode allows sub-diffraction limited optical modes despite the absence of metals. Here, the jump of the dielectric permittivity across the high index silicon claddings and the low index center section (comprised of oxide/ITO/oxide) allows for optical confinement in the SIS configuration (FIG. 7). With a certain bias voltage, both the propagation constant and absorption coefficient of the fundamental transverse magnetic (TM)-like mode change considerably. The SIS slot waveguide uses a 10 nm ITO thin film layer sandwiched between two p-Si layers of 150 nm separated by two oxide layers each 5 nm to facilitate gating (FIG. 7(c)).

This ITO layer can be considered as a degenerate semiconductor with a large number of electrons. For the oxides, we selected the high-k dielectric $HfO_2$ for the following two reasons: a) $HfO_2$ has a high static permittivity ($\epsilon_{HfO_2}$~25) which increases the electrical capacitance, and thus allows lowering the gating voltage in tuning this cavity, thus helping to lower the energy overhead of active reconfiguration; and b) $HfO_2$ thin films can be reliably grown with the atomic layer deposition (ALD) process. A 1D photonic crystal nanobeam cavity (PCNB) incorporated with the ITO vertical slot waveguide is formed by creating vertical openings forming the mirror and taper sections. The nanobeam cavity considered here is essentially a wavelength-scale Fabry-Pérot etalon formed by sandwiching a defect section between 1D photonic crystal Bloch mirrors and tapered sections.

Figure 7A:
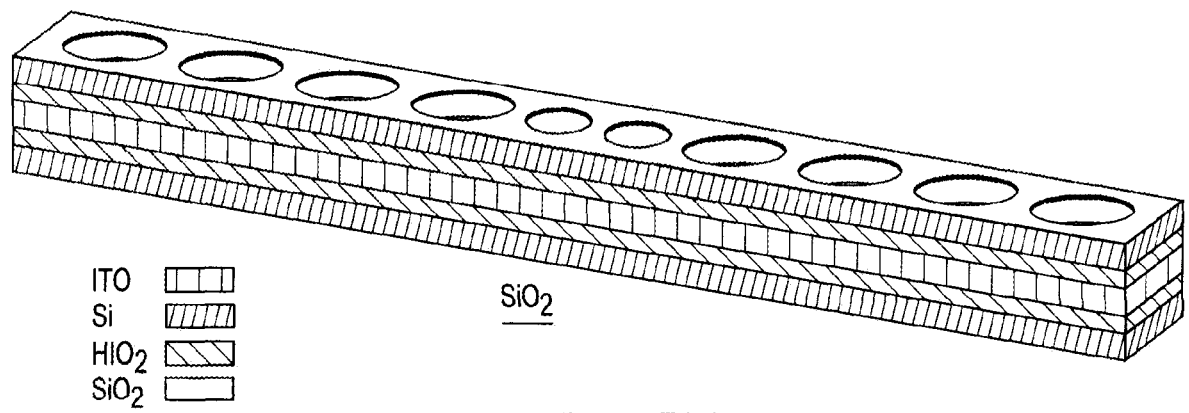
FIG. 7(a) shows a 3D perspective view of the vertical slot ITO PCNB cavity with air holes.
Figure 7B:
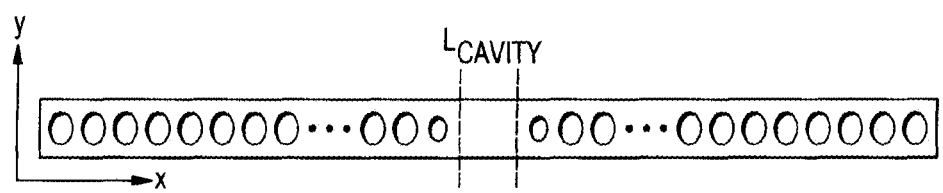
FIG. 7(b) is a top view of FIG. 7(a)
Figure 7C:
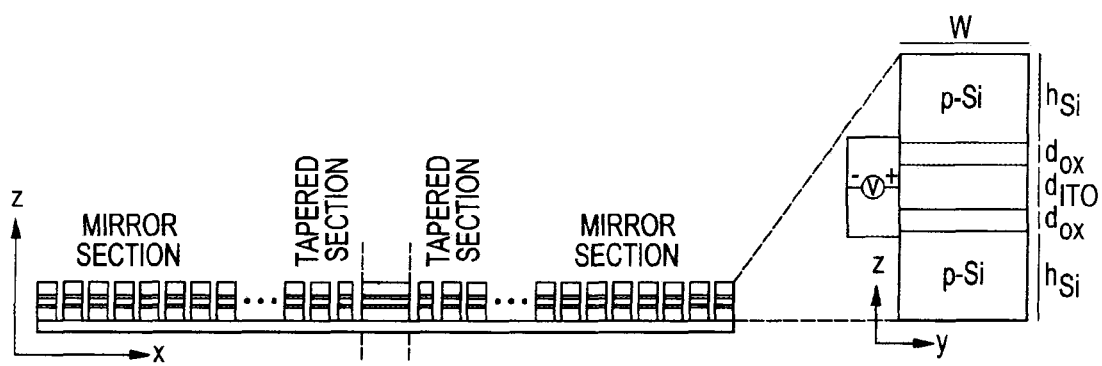
FIG. 7(c) is a side view, longitudinal cross-section, and the cross-sectional structure is shown as an inset.

Light in the longitudinal direction in the nanobeam is confined by a principle of total internal reflection (FIG. 7(a)). Similar to a Fabry-Pérot spacer, the mirror and tapered section holes at the center of the PhC effectively confine the light in the propagating direction inside the central cavity section by the principle of total internal reflection from the mirrors formed by the air holes. In other words, the taper sections achieved using a 14-hole linear taper are only used for improving mode impedance mismatch and minimizing the reflection. The design parameters of the 1D PCNB cavity include the cavity length of 100 nm; hole period of mirror section, a is 365 nm; minimum hole distance of taper section, $a_{min\_taper}$ is 230 nm; hole radius, r=0.28a; number of taper hole pairs, n=14; number of mirror hole pairs, m=18; waveguide height, h is 320 nm. This 1D photonic crystal is simulated by the excitation of a fundamental TM-like $1^{st}$ order dipole source from the z-axis and the length span of the device is in the x-direction. The length and width of the PCNB structure are 23 μm and 300 nm, respectively (FIGS. 7(b), 7(d)).

The PCNB structure is integrated into a typical SOI substrate with a buried oxide of 1 μm thickness. The high confinement of the mode in the active region in the ITO away from the substrate, with symmetric Si upper and lower claddings, allows insignificant leakage of light into the substrate. Conceptually this cavity could be fabricated in either top-down or bottom-up approaches. The latter may, however, be challenging since deposition conformity across varying mechanisms required for the various layers, may not result in a clean lift off. In contrast, in a top-down approach one can form the proposed cavity structure depositing all layers followed by one single patterning step and etching the air holes on the vertical slot waveguide using a hard mask (e.g. Cr). The layered materials (Si, $HfO_2$ and ITO) can be etched by reactive ion etching, for instance, using $CF_4$ and subsequently Cr etchants (e.g. CR7) can be used to etch away the hard mask. The carrier concentration levels, effective indices and extinction coefficients corresponding to the states of operation in this work are listed in Table 3.

TABLE 3

ITO carrier concentration levels, effective indices and extinction coefficients corresponding to the states of operation for the tunable PCNB cavity

| States of operation | ITO Carrier Concentration (cm$^{-3}$) | Modal effective index, $\tilde{n}_{eff}$ | |
|---|---|---|---|
| | | Real part, $n_{eff}$ | Imaginary part, $\kappa_{eff}$ |
| ON | $10^{19}$ | 2.27 | $2.14 \times 10^{-4}$ |
| OFF | $10^{20}$ | 2.25 | $2.53 \times 10^{-3}$ |

Figure 7D:
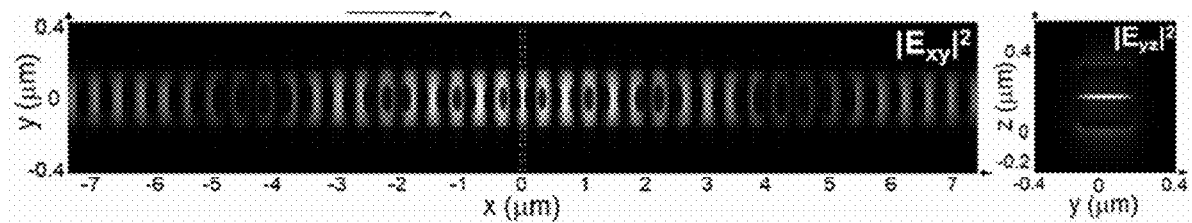
FIG. 7(d) is an electric field intensity distribution profile.

FIG. 7(d) shows the electric field intensity, $|E|^2$, distribution profiles of the cavity mode. TM-like 1st order mode of 1D PCNB cavity showcased by $|E_{XY}|^2$ is recorded in the xy-plane at the cavity center along the z-direction. The cavity mode is excited by placing an electric dipole source with z-orientation inside the vertical slot cavity. The 1D ITO PCNB cavity exhibits a TM-like fundamental 1st order mode (i.e., dominant E-field in the z-direction) (FIG. 7(d), right side). The electric field of the TM mode extends longitudinally along the waveguide, which is consistent with free-standing dual-polarized silicon PhC nanobeam cavities. In addition, the electric field profile is confined in the low index active region between these air holes. As expected, light-matter interaction (LMI) is enhanced in this type of structure compared to a bulk photonic structure due to increased confinement. The feedback from the mirror sections and subsequent impedance matching from the tapered sections allow the confinement of light inside the cavity (centered at x=0) in the longitudinal propagating direction (x-orientation), which is evident in the cavity profiles for the xy and yz-plane (FIG. 7(d)). The cavity as a means of storage for the energy (i.e. $|E|^2$) is also discernible from the cavity xy and xz profiles as both exhibit the highest field intensity near x=0 (cavity region).

Figure 7E:
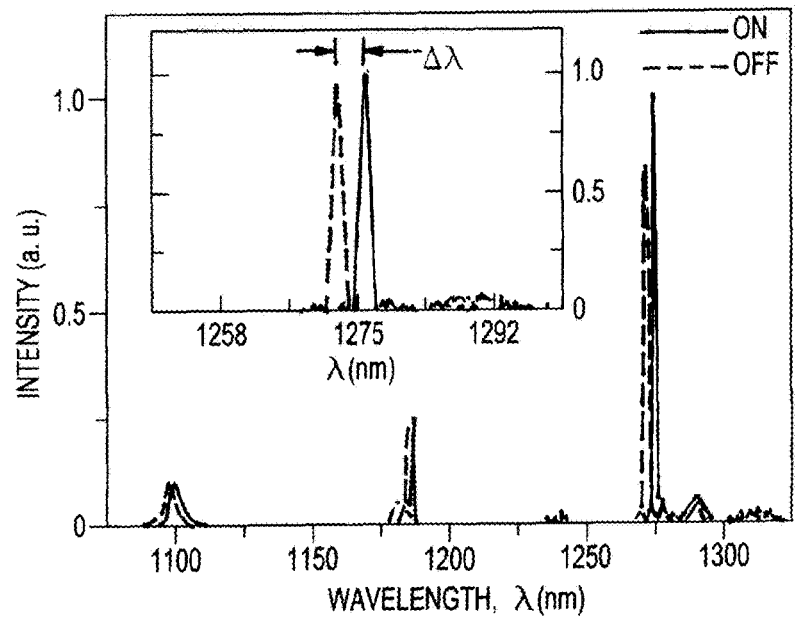
FIG. 7(e) is a graph of transmission intensity vs. wavelength characterizing the resonance shift in the cavity in the inset.
Figure 7F:
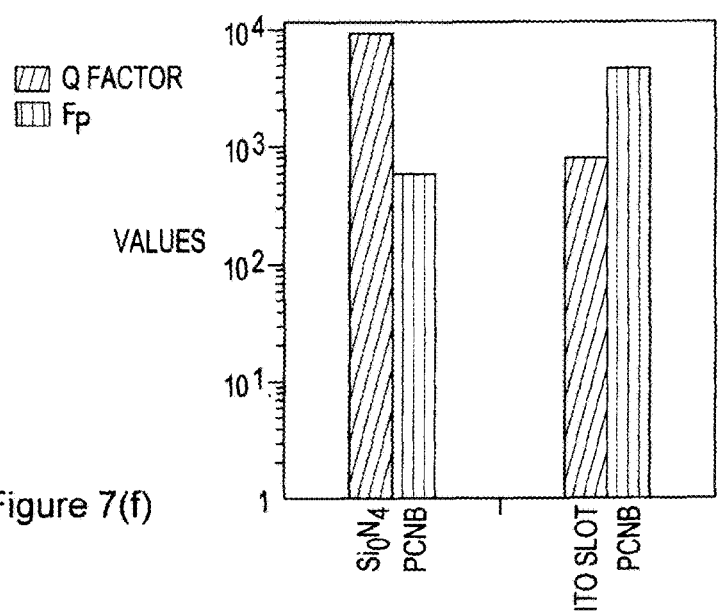
FIG. 7(f) is a graph manifesting Q-factor and Purcell factor enhancements over similar prior art.

Referring to FIG. 7(e), transmission intensity versus wavelength, corresponding to states of operation is shown. The tunability of the cavity is shown in the inset near the telecom O-band, the change in wavelength ~3.4 nm. In FIG. 7(f), the quality factor, Q and Purcell factor, $F_p$ of the ITO vertical slot PCNB cavity is compared to a similar $Si_3N_4$ 1D PCNB cavity.

Tuning is an effect of change in the effective refractive index, $n_{eff}$. The subsequent broadening of the cavity resonances with respect to wavelength can be related back to the loss in the modal absorption, corresponding to the effective extinction coefficient, $\kappa_{eff}$. The shift in resonance with the change in carrier concentration, i.e. tuning, $\Delta\lambda$, results from the change in the effective refractive index (real part), $\Delta n_{eff}$, from the aforementioned modal tuning properties. Our results show a considerable amount of wavelength tuning, $\Delta\lambda$~3.4 nm, for the slot ITO PCNB cavity (FIG. 7(e)). From ON to OFF state, the cavity exhibits blue-shifts in the resonances originating from the effective index decrease. Loss also increases with tuning as a direct result from the Kramers-Kronig relations.

Regarding the tuning range (i.e., carrier concentration levels), we have managed to keep this and subsequent broadening of the resonances low due to: a) selectively reducing the allowable carrier concentration tuning range in the n-dominant region away from the ENZ region, and b) by selecting a low carrier concentration initial point (ON state) of $10^{19}$ cm$^{-3}$, where ITO behaves as a dielectric. As the resonances broaden with tuning, the cavity Q-factor is also reduced. This subsequent loss trivially lowers the finesse ($\mathcal{F}$) of the cavity, hence only slight changes in the Q-factor are introduced despite the higher effective index ($\kappa_{eff}$) change, since increase in mirror quality with tuning (higher reflection since more metallic) is compensated by the higher loss.

For the ITO slot PCNB cavity we achieve the Q value of ~774 (695) in the ON (OFF) state, where the lower Q-value of the OFF state originates from the modal absorption increase (FIG. 7(h)). The Q-factors calculated here use a low-Q cavity method used in the Lumerical FDTD solutions, which is determined through the Fourier transform of the field by finding the resonant frequencies ($f_R$) of the signal and measuring the full width half maximum (FWHM, $\Delta f$) of the resonant peaks, i.e., Q=$f_R/\Delta f$, if the electromagnetic fields decay completely from the simulation in a time that can be reasonably simulated by FDTD.

The longitudinal (z-axis) confinement leads to the necessary cavity feedback to facilitate stimulated emission (lasing), if optically or electrically pumping the gain medium. In recent history, the Purcell factor, $F_p$, is used to describe the LMI in laser physics as it relates to a measure of the spontaneous emission rate enhancement of a dipole emitter source placed in the cavity compared to internal radiative recombination rates in a homogeneous semiconductor material, given by $$F_p = \frac{3}{4\pi^2}\left(\frac{\lambda_R}{n}\right)^3\left(\frac{Q}{V_{mode}}\right) \quad (6)$$

where $\lambda_R$ is the resonant free-space wavelength of the cavity, n is the real part of the complex refractive index at the field antinode, and $V_{mode}$ can be estimated from a commonly used definition as $$V_{mode} = \frac{\int \epsilon |E(r)|^2 dV}{\max\{\epsilon |E(r)|^2\}} \quad (7)$$

where $\epsilon$ is the dielectric constant, E(r) is the electric field strength, and V is a quantization volume encompassing the resonator and with a boundary in the radiation zone of the cavity. Eq. (6) indicates that a large Q and a smaller $V_{mode}$ are desired to enhance emission rate (i.e. $F_p$). Evidently, there exist two techniques to increase the Purcell factor—the classical approach is enhancing the cavity Q-factor, and the other one is minimizing the mode volume, $V_{mode}$.

However, the former is rather unpractical since it not only requires increased wafer space, but also has negative effects for data communication applications, particularly for lasers driven in a direct modulation mode due to the long cavity photon lifetimes inside the high-Q cavity, $\tau_{ph}=Q\lambda/2\pi c$, where $\lambda$ is the operating resonant wavelength and c is the speed of light in vacuum. Although the small mode volumes of PCNB cavities can be attained by a proper design, high-Q factors are typically obtained using extensive parameter search and optimization.

As our slot structure can squeeze in the light in the active region due to higher confinement arising from the index contrast, the small modal area leads to a miniscule diffraction limited mode volume in a cubic half-wavelength in material of ~0.1 $(\lambda/2n)^3$ in the cavity. Since Q is ultimately limited in practice by other factors, such as bandwidth considerations, material absorption, or fabrication tolerances, minimizing $V_{mode}$ for a given Q is a preferred solution with practical applications in mind. Such optical cavities enable spontaneous emission rates that are faster than the stimulated emission rates for nanoscale light-emitting devices.

Note, this is not only limited to nanoscale-based laser cavities but also can be applied to conventional laser designs as well. On the other hand, the internal dynamics leading toward the laser threshold are more efficiently utilized when a smaller optical mode volume is used (i.e., higher $F_p$ and spontaneous emission coupling factor, β). The case with a smaller mode volume often translates into a low power requirement. It is worthy to mention that while traditional techniques involving tunable lasers utilize changing the feedback system of the cavity usually by changing the cavity length (i.e. effective path length), our proposed design can utilize the tunability from effective index tuning in the cavity free from moving parts and providing degrees of freedom in design.

Comparing the cavity performance of a $Si_3N_4$ 1D PCNB cavity from Liu K. and Sorger V. J., 2015 (Enhanced interaction strength for square plasmon resonator embedded in a photonic crystal nanobeam cavity, J. Nanophotonics 9093790) to our results shows that the Q-factor has declined by about one order of magnitude because of the addition of the lossy ITO, yet the Purcell factor has risen by about the same amount (FIG. 7(f)); in detail, Q-factor ~10,000 for the $Si_3N_4$ PCNB to ~770 for the ITO slot PCNB, which can be contributed to the inherent orders of magnitude higher loss in the ITO material. However, we observe a significantly higher Purcell factor enhancement from ~620 for the $Si_3N_4$ PCNB to ~4820 (~4320) for the ITO slot PCNB cavity ON (OFF) state. This can be attributed to the strong modal confinement in our vertical slot structure, essentially squeezing the light into the active region arising from sufficient index contrast in the mode. As such, we are able to reduce the effective modal area resulting in a modest small mode volume.

Graphene/Oxide/ITO EAM

Figure 8A:
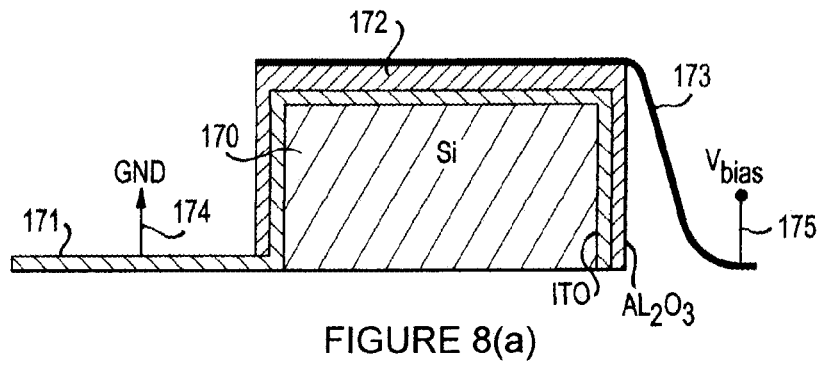
FIG. 8(a) is a cross-section schematic of a ITO/oxide/Graphene capacitor enabled absorption modulator in accordance with the invention.
Figure 8B:
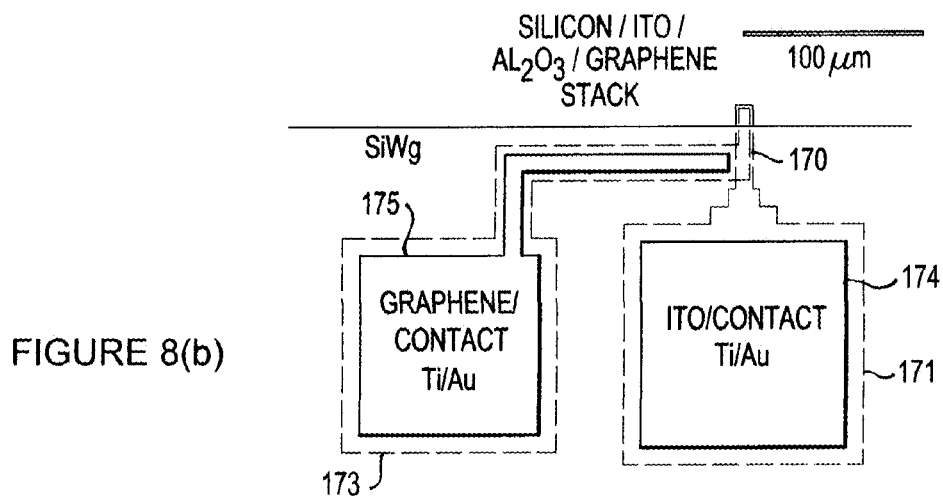
FIG. 8(b) is an optical microscope image of the ITO/oxide/Graphene absorption modulator in FIG. 8(a)
Figure 8C:
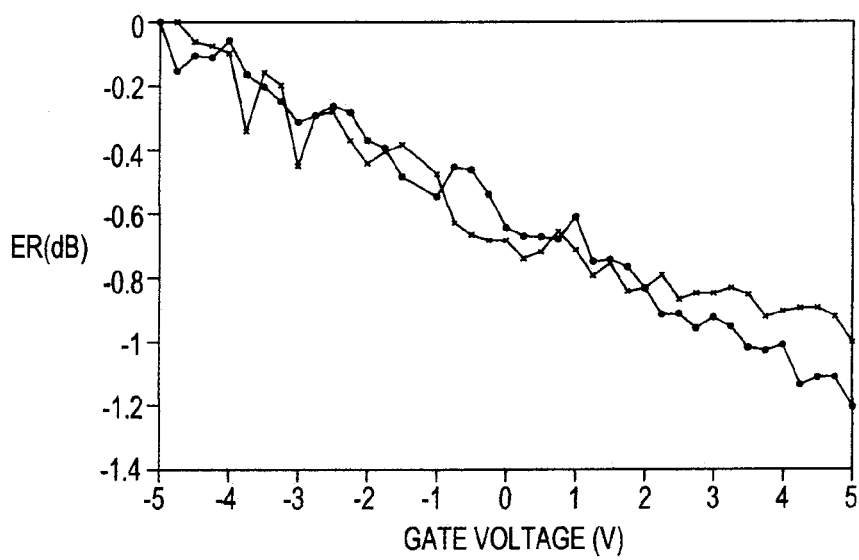
FIG. 8(c) is a graph of ER vs. bias voltage.
Figure 8D:
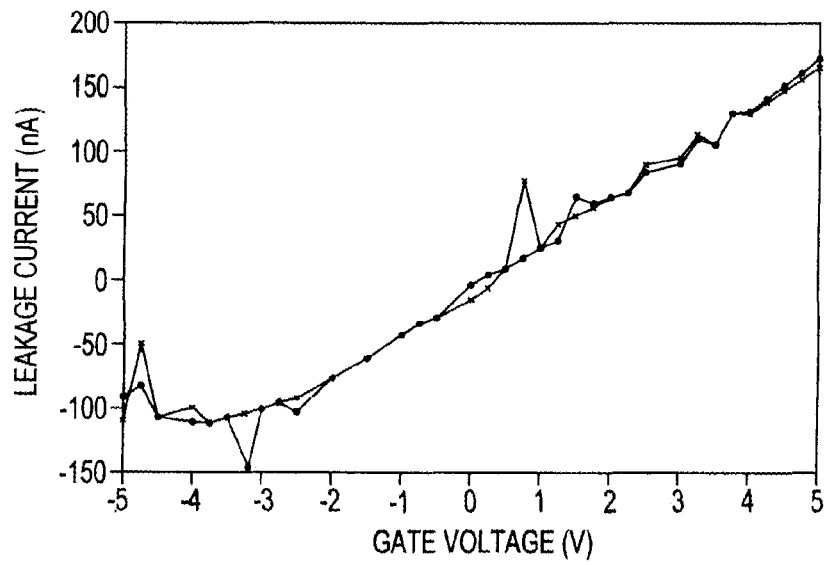
FIG. 8(*d*) is a graph of I-V measurements of the modulator in FIG. 8(*b*)
Figure 8E:
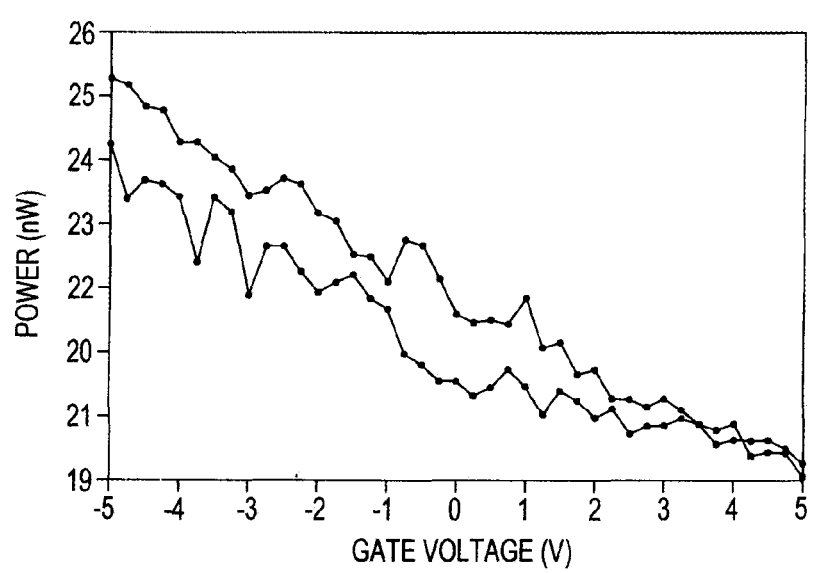

An absorption modulator with graphene 173/oxide 172/ITO 171 capacitive stack on top of a linear Si waveguide 170 embodies the current invention as shown in FIG. 8(a), whereas any TCO/dielectric/2-dimensional material can be used in similar manner. The area of the ITO film in contact with the waveguide is defined through electron beam lithography (FIG. 8(b)). Afterwards, the 10 nm film of ITO 174 is deposited on top of one of the passive waveguides 170 on SOI substrate at room temperature via ion beam deposition (IBD) using the 4Wave IBD/BTD cluster sputter deposition system. An RF ion gun focuses Ar ions onto substrate targets of ITO. The ITO target stoichiometry is 90 wt. % $In_2O_3$/1.0 wt. % $SnO_2$. A small flow of $O_2$ (2 SCCM) is used. The process used an Ar flow rate of 16 SCCM, a beam voltage of 600 V, a beam current of 220 mA, and an acceleration voltage of 150 V. The sample was set at an angle of 115° and rotated at 10 rpm to ensure smooth profile. The deposition rate used was 0.77 Å/s. The temperature for the process was 20° C. to refrain annealing effects. The base vacuum used was $2\times10^{-8}$ Torr, and the deposition uniformity was confirmed as 1.5% (1σ) over a 190 mm diameter.

The $Al_2O_3$ oxide 172 was deposited using the atomic layer deposition (ALD) technique as it provides reliable performance characteristics. The Fiji G2 ALD tool was used at low temperature settings (100° C.) for 200 cycles to deposit about 20 nm of $Al_2O_3$ to ensure higher film quality and to avoid any annealing effects to the ITO. An etch step was required on top of the ITO contact 174 to remove the oxide over it for electrical probing. We used a rather slow wet etch process for $Al_2O_3$ etching using an MF319 solution in the contact pad area. MF319 contains tetramethylammonium hydroxide (TMAH) which reacts with the Al and can etch the oxide thereof. Next, monolayer graphene film 173 (Graphenea, Easy Transfer) was wet transferred onto the substrate and then patterned by EBL (Raith Voyager) with negative photoresist (AR-N 7520) followed by oxygen plasma etching. After graphene patterning, an EBL step defined the contact pads 175, followed by Ti/Au deposition and lift-off process. The optical image of the device in FIG. 8(*b*) depicts an electro-absorption modulator, with a lateral side of just 10 μm.

Results highlighted in FIG. 8(*c*) show a 1.5 dB extinction ratio when a 5 V bias voltage is applied ($V_{bias}$) between the ITO layer and graphene in a capacitor configuration. The modulator has a higher modulation range (higher absorption) compared to a hypothetical device constituted by either a single layer graphene or single layer ITO or dual layer graphene, since both ITO and graphene are concurrently contributing in absorbing light when electrostatically tuned and the mode overlap with ITO is quite significant. This device configuration, thanks to the low RC delay enables high speed (up to few tens of GHz). Furthermore, the graphene besides providing electrical contact and enhancing the modulation range, help to minimize the insertion losses that the device would have if a metal contact had been used instead in a plasmonic configuration. The leakage current (FIG. 8(*d*)) confirms the goodness of the capacitor and the $Al_2O_3$ layer and ensure a correct operation when modulating the optical signal (FIG. 8(*e*)).

It is noted that the invention is shown and described for light modulation. It is further noted that the modulator concept can also be used in free-space technology such as for spatial light modulators for example. These devices modulate either the transmission or reflection of an optical beam via changing the optical refractive index as done here. In addition, the present invention has emerging applications in quantum photonics, neuromorphic photonics, and beam steering; enabling use in applications such as compact phase shifters, nonlinear activation functions in photonic neural networks, phased array applications for LiDAR, etc. The invention can avail ease of fabrication and potential CMOS integration.

The foregoing description and drawings should be considered as illustrative only of the principles of the invention. The invention may be configured in a variety of shapes and sizes and is not intended to be limited by the embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A photonic Mach Zehnder Interferometer (MZI) assembly operating across a broadband spectral region, comprising:
   a first arm comprising a first photonic waveguide transmitting a first light having a first phase;
   a second arm comprising a second photonic waveguide transmitting a second light having a second phase;
   the first arm and the second arm forming a photonic MZI operating across a broadband spectral region;
   a gate oxide that contacts and surrounds at least a portion of said first arm; a current-driven Transparent Conducting Oxide (TCO) based assembly that contacts and surrounds at least a portion of the gate oxide;
   a voltage source coupled to the current-driven TCO based assembly to apply a voltage to the current driven TCO based assembly to modulate the first phase of the first light traveling in said first photonic waveguide; and
   a ground coupled to the first arm or the second arm.

2. The MZI assembly of claim 1, wherein said current-driven TCO based assembly comprises an optical refractive index modulator positioned about said first photonic waveguide to modulate the phase or amplitude, or combination thereof of the light traveling in said first photonic waveguide.

3. The MZI assembly of claim 1, wherein the current-driven TCO based assembly modulates the first phase of the first light traveling in said first photonic waveguide with respect to the second phase of the second light traveling in said second photonic waveguide, so that the first light is either in-phase with or out-of-phase with the second light.

4. The MZI assembly of claim 1, wherein said first photonic waveguide, said second photonic waveguide, has half wave voltage and length product $V_\pi L$ of 63-520 V·μm.

5. The MZI assembly of claim 1, wherein said current-driven TCO based assembly comprises a first capacitor electrode, and further comprising a second capacitor electrode with a resistive material.

6. The MZI assembly of claim 5, wherein said resistive material comprises a TCO material, metal, a 2D material, dielectric or doped dielectric, gel material or any combination of these materials thereof.

7. The MZI assembly of claim 5, wherein said first and second capacitor electrodes are arranged vertically or laterally.

8. The MZI assembly of claim 1, wherein the ground is coupled to the first arm separated from the current-driven TCO based assembly.

9. The MZI assembly of claim 1, wherein the ground is coupled to the second arm.

10. The MZI assembly of claim 1, further comprising a biasing metal contact that contacts and surrounds at least a portion of said current-driven TCO based assembly.

11. The MZI assembly of claim 1, wherein said current-driven TCO based assembly has a plasmonic mode.

12. The MZI assembly of claim 1, wherein said TCO based assembly modulates absorption of the light traveling in said first photonic waveguide resulting in different amplitude at an output of said first photonic waveguide due to changing absorption of the TCO based assembly with bias.

13. The MZI assembly of claim 1, wherein said TCO based assembly modulates the first or second phase or amplitude, or combination thereof of the first and second light traveling in said first or second arm.

14. The MZI assembly of claim 1, wherein said wherein said TCO based assembly comprises Indium Tin Oxide (ITO), Indium-doped Zinc Oxide (IZO), Gallium-doped Zinc Oxide (GZO), Aluminum doped Zinc Oxide (AZO), Fluorine doped Tin Oxide (FTO), Magnesium-doped Zinc Oxide (MZO), Aluminum and Gallium co-doped Zinc Oxide (AGZO), Indium gallium zinc oxide (IGZO), Indium oxide (In2O3) or Zinc Oxide (ZnO).

15. The MZI assembly of claim 1, wherein said first and second photonic waveguides comprise Transverse Electric (TE) or Transverse Magnetic (TM) modes, photonic or surface-plasmon-based mode, or a hybrid of photon/plasmon modes.

16. The MZI assembly of claim 1, wherein said TCO based assembly can be integrated into silicon photonics, silicon nitride photonics, III-V based photonics, polymer-based waveguide structures, any oxide or nitride based waveguide platform, or any material forming a waveguide including fiber-based structures.

17. The MZI assembly of claim 1, wherein said TCO based assembly capacitively induces carrier accumulation/depletion leading to a change in an optical index of refraction of the first and second light traveling in said first and second photonic waveguides which modulates the phase and/or amplitude of the first and second light traveling in said first and second photonic waveguides.

18. The MZI assembly of claim 17, wherein the change in the optical index of refraction can be a real part of the optical index of refraction and/or an imaginary part of the optical index of refraction.

19. The MZI assembly of claim 1, wherein said TCO based assembly comprises a first TCO capacitor electrode, and further comprising a second capacitor electrode comprising a resistive material.

20. The MZI assembly of claim 1, wherein said TCO based assembly is in close proximity to contacts of said first and second photonic waveguides.

21. The MZI assembly of claim 20, wherein the close proximity is $\leq \lambda$, where $\lambda$ is the wavelength of light propagating through the said waveguide.

* * * * *